United States Patent
Matsukuma et al.

[11] Patent Number: 5,966,129
[45] Date of Patent: Oct. 12, 1999

[54] SYSTEM FOR, AND METHOD OF DISPLAYING AN IMAGE OF AN OBJECT RESPONSIVE TO AN OPERATOR'S COMMAND

[75] Inventors: Nobuhiko Matsukuma, Kokubunji; Manabu Yanagimoto, Sagamihara, both of Japan; Hiroaki Takatsuki, Boston, Mass.; Narihiro Munemasa, Yokohama, Japan; Toshio Moriya, Tokyo, Japan; Nobuhiro Sekimoto, Kodaira, Japan; Tsuneya Kurihara, Tokyo, Japan; Masanori Miyoshi, Hitachi, Japan

[73] Assignee: Hitachi, Ltd., Tokyo, Japan

[21] Appl. No.: 08/731,163

[22] Filed: Oct. 10, 1996

[30] Foreign Application Priority Data

Oct. 13, 1995 [JP] Japan .................................. 7-266042

[51] Int. Cl.$^6$ .................................................. G09B 29/00
[52] U.S. Cl. ........................................ 345/418; 345/419
[58] Field of Search .................................... 345/418, 419, 345/420, 421, 422, 423, 424

[56] References Cited

U.S. PATENT DOCUMENTS 5,671,342   9/1997   Miller et al. .............................. 345/418
5,838,973  11/1998   Carpenter-Smith et al. ........... 345/418
5,850,222  12/1998   Cone ........................................ 345/419

FOREIGN PATENT DOCUMENTS

A-5-31256    2/1993   Japan .
A-6-83933    3/1994   Japan .
A-8-44490    2/1995   Japan .
A-7-262400  10/1995   Japan .

OTHER PUBLICATIONS

"ACCESS", summer 1994, vol. 8, No. 2.
"SIGGRAPH 94 Visual Proceedings" pp. 218–267.

*Primary Examiner*—Phu K. Nguyen
*Assistant Examiner*—Cliff N. Vo
*Attorney, Agent, or Firm*—Antonelli, Terry, Stout & Kraus, LLP

[57] ABSTRACT

An image producing/displaying apparatus capable of inputting a command for changing a state of an object regardless of a form of the object includes a virtual world expressing system for constructing a virtual world including at least one object and environment in which the object exists and producing an image for visually displaying at least part of the virtual world, an output system for visualizing the image produced by the virtual world expressing system and outputting the image, and a command input system for inputting a command to the virtual world expressing system. The command input system detects a movement state of a specific pixel pattern contained in an image formed by an imaging device and extracts feature quantity from the movement state to recognize the command so that the command is notified to the virtual world expressing system.

14 Claims, 37 Drawing Sheets

OBJECT

| No | VERTEX 1 | VERTEX 2 | VERTEX 3 | VERTEX 4 |
|----|----------|----------|----------|----------|
| f1 | 1 | 5 | 6 | 2 |
| f2 | 2 | 6 | 7 | 3 |
| f3 | 3 | 7 | 8 | 4 |
| f4 | 5 | 9 | 10 | 6 |
| f5 | 6 | 10 | 11 | 7 |
| f6 | 7 | 11 | 12 | 8 |
| . | . | . | . | . |
| . | . | . | . | . |

| No | X | Y | Z | BONE 1 | BONE 2 | BONE 3 | ...... |
|----|------|-----|-----|--------|--------|--------|--------|
| 1 | 0.5 | 1.1 | 0.1 | 1.0 | 0.0 | . | |
| 2 | 0.7 | 1.2 | 0.2 | 0.8 | 0.2 | . | |
| 3 | 0.7 | 0.8 | 0.2 | 0.6 | 0-.4 | . | |
| 4 | 0.45 | 0.7 | 0.1 | 0.4 | 0.6 | . | |
| 5 | . | . | . | . | . | | |
| . | . | . | . | . | . | | |
| . | . | . | . | . | . | | |

SWIMMING MOTION

TURNING MOTION

FIG. 28a
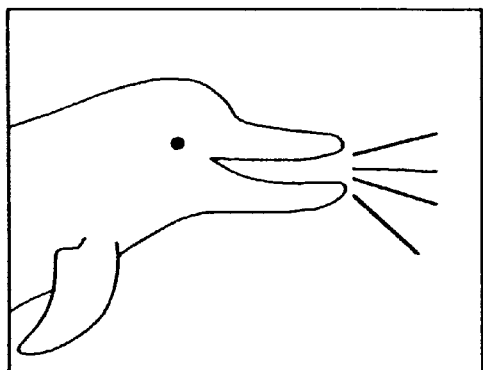
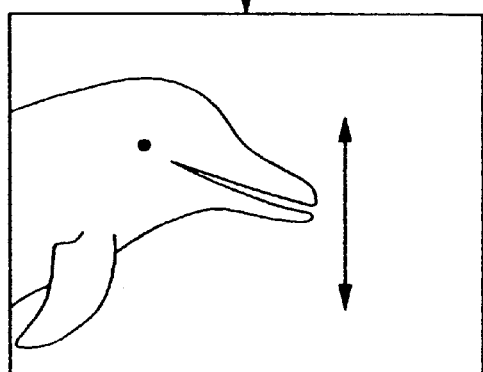
FIG. 28b
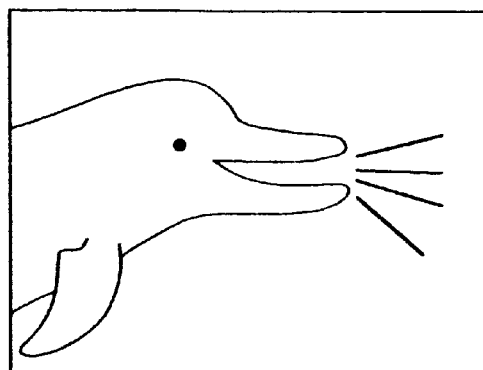
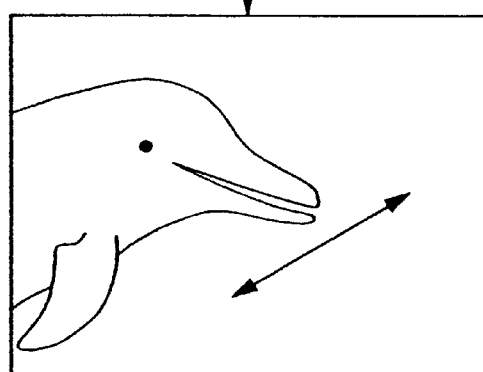
FIG. 29
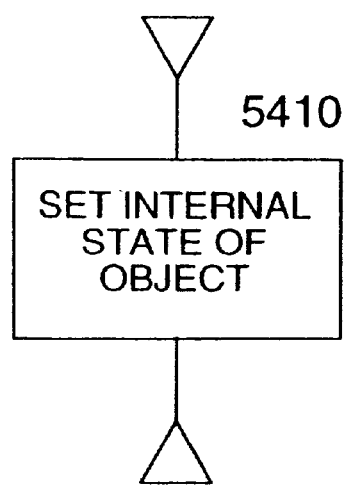

FIG. 30

| No | VIGOR (H) | TARGET POINT (C) | COMMAND (m) | COLLISION POSSIBILITY (r) |
|----|-----------|------------------|-------------|---------------------------|
| 1  | 0.5       | NOTHING          | JUMP        | NO                        |
| 2  | 0.9       | PLACE A          | GO          | YES                       |
| 3  | 0.2       | NOTHING          | NOTHING     | NO                        |
| ⋮  | ⋮         | ⋮                | ⋮           | ⋮                         |

FIG. 31

| No | X  | Y  | Z  | α   | β   | γ   | Vx   | Vy  | Vz  |
|----|----|----|----|-----|-----|-----|------|-----|-----|
| 1  | 10 | -6 | 16 | -10 | 30  | -10 | 0    | 0   | 4.0 |
| 2  | 23 | -8 | 94 | 5   | -6  | 2   | 0.5  | 0.5 | 2.0 |
| 3  | 45 | -2 | 23 | 3   | 150 | 30  | -0.4 | -1  | 1.1 |
| ⋮  | ⋮  | ⋮  | ⋮  | ⋮   | ⋮   | ⋮   | ⋮    | ⋮   | ⋮   |

BEFORE CHANGE OF FIGURE

AFTER CHANGE OF FIGURE

FIG. 43
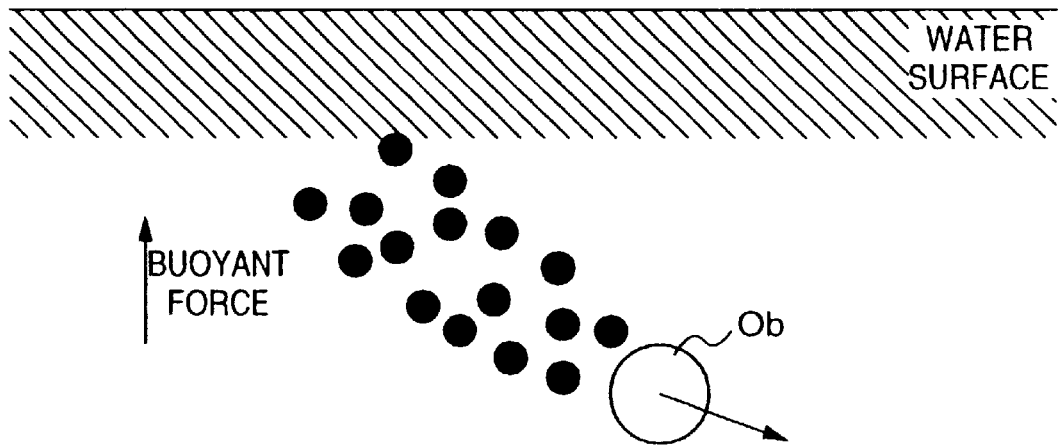
FIG. 44
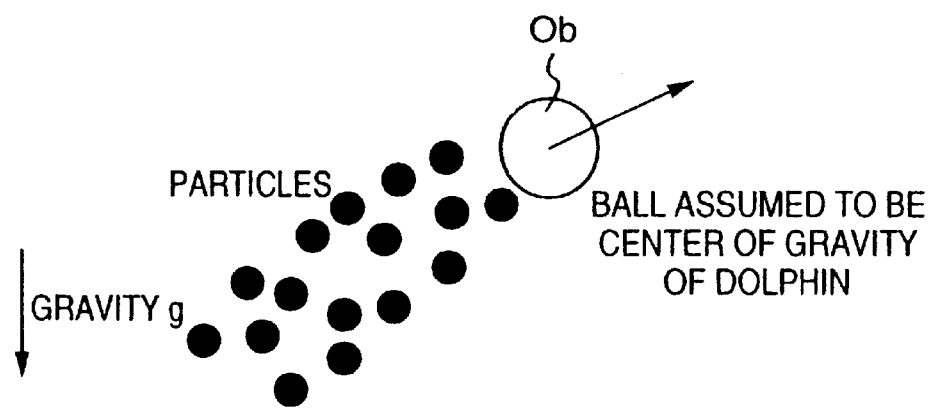
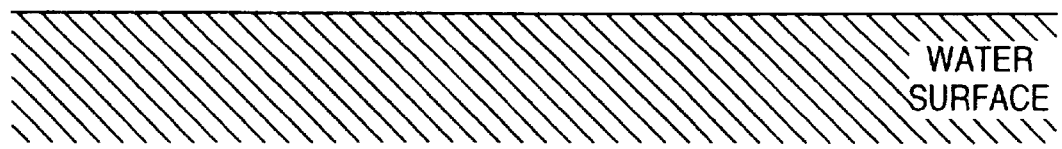

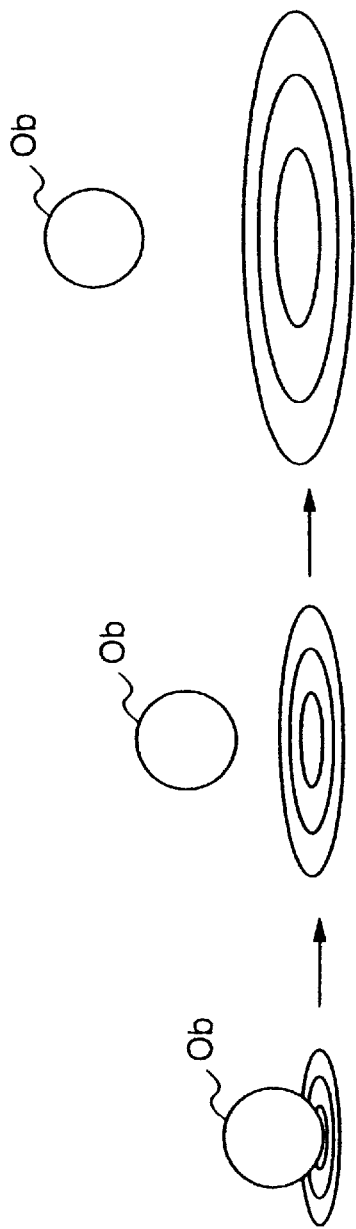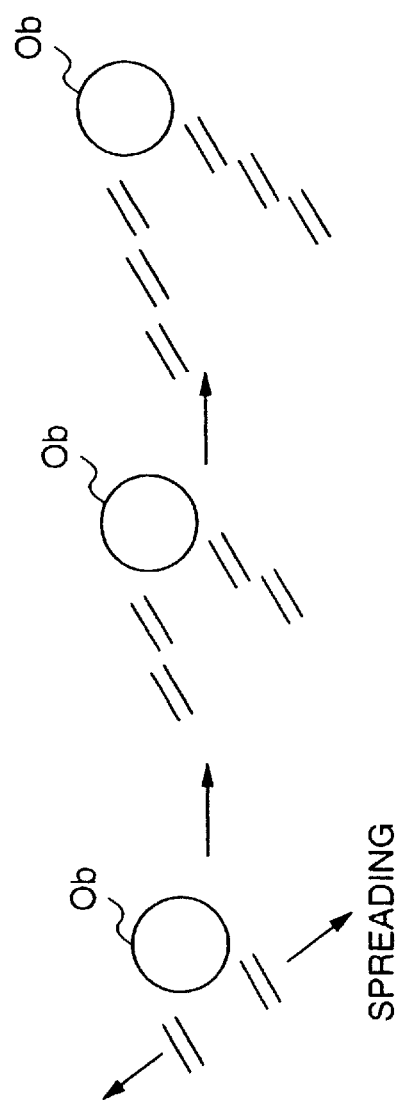

SYSTEM FOR, AND METHOD OF DISPLAYING AN IMAGE OF AN OBJECT RESPONSIVE TO AN OPERATOR'S COMMAND

BACKGROUND OF THE INVENTION

The present invention relates to an image producing/displaying apparatus for producing and displaying an image, and more particularly to an image producing/displaying apparatus which can produce an image for visually displaying at least part of a virtual world including at least one object and environment in which the object exists, and further displaying the image after receiving a command to change a state of at least one object existing in the virtual world.

An image producing/displaying apparatus includes an apparatus for producing and displaying images for various events occurring in a virtual world including objects, an apparatus for producing and displaying events occurring in a real world as events in a virtual world which is a model of the real world, and the like. As examples of such apparatuses, there are electronic game machines, an animation displaying apparatus such as a virtual reality system, a navigation system and the like. In such an image displaying apparatus, it is sometimes necessary to give a command to an object displayed in a picture such as, for example, a person or a thing so that the object is changed to a desired state to be displayed in the picture. Particularly, in an electronic game and the virtual reality system, it is desired in respect of improvement of the game and the reality to give a command to the object and change a state thereof.

In the animation, when motion of an object is commanded, it is necessary to input numerical values for a distance of movement, an angle of a joint and the like for elements constituting a form of the object individually. Hence, it takes a great deal of time to command the motion of the object. Accordingly, as a matter of course, it is difficult to change the image in real time.

On the other hand, there is a method whereby a gesture is taken in as an image by means of the motion capture technique and movement of the gesture is reflected to a virtual world to give a command for the motion of the object. This method requires means for forming an image of the gesture and means for extracting movement of the gesture to convert it into motion of the object. With this method, a command for motion can be input quickly and the image can be changed in real time as compared with the individual input of the numerical values.

However, when a command for motion is given using the gesture as it is, it is necessary that an object has the same shape as a person. In other words, for an object having a shape that is different from a person, for example a fish, it is difficult to convert the gesture into the command for motion.

Further, when the gesture is taken in as an image to use it as the command for motion, it is not necessarily easy to identify which is the gesture for the command for motion while a person is being moved. Accordingly, it is necessary to judge whether motion of a person expressed in the picture is a command or not. However, the judgment is not necessarily made easily and increased burden is loaded on an apparatus. Further, there is a case where the command cannot be extracted exactly.

SUMMARY OF THE INVENTION

It is an object of the present invention to provide an image producing/displaying apparatus in which a command for changing a state of an object can be input irrespective of a form of the object.

It is another object of the present invention to provide an image producing/displaying apparatus in which a command can be extracted easily and precisely.

According to an aspect of the present invention, there is provided an image producing/displaying apparatus for producing and displaying an image comprising a virtual world expressing system which provides virtual world including at least one object and an environment in which the object exists and produces an image for visually displaying at least part of the virtual world, an output system for visualizing the image produced by the virtual world expressing system and outputting the image, and a command input system for inputting a command to the virtual world expressing system, the command input system comprising:

imaging means for forming an image of fixed space; and command content recognizing means for detecting a movement state of a specific pixel pattern contained in the formed image to extract feature quantity from the movement state and comparing the feature quantity with a predetermined reference to recognize a relevant command so that the command is notified to the virtual world expressing system when the command can be recognized;

the virtual world expressing system comprising:

state setting means for setting states of the object and the environment included in the virtual world; and image producing means for producing an image of the virtual world on the basis of information set in the state setting means;

the state setting means changing, when the notified command is related to any object, the setting of the state of the object on the basis of the command.

According to another aspect of the present invention, there is provided the image producing/displaying apparatus in which the command input system further comprises command start determination means for determining start of the command;

the command start determination means detects the specific pixel pattern in the image formed in a serial time manner by the imaging means to judge that the command is started when the pixel pattern appears; and the command content recognizing means recognizes contents of the command after the command start determination means judges that the command has started.

Further, according to another aspect of the present invention, there is provided a command input system for inputting a command to an information processing unit, comprising:

imaging means for forming an image of fixed space in a serial time manner;

means for detecting a movement state of the specific pixel pattern contained in the image formed in a serial time manner by the imaging means;

means for extracting feature quantity from the movement state; and means for comparing the feature quantity with a predetermined reference to retrieve a command corresponding to the extracted feature quantity so that when there is a relevant means, the command is received as an input to be notified to the virtual world expressing system.

The means for detecting the movement locus of the specific pixel pattern further comprises means for determining whether the specific pixel pattern exists in the image formed by the imaging means or not and for detecting the movement state of the specific image when the specific image exists.

BRIEF DESCRIPTION OF THE DRAWINGS

FIGS. 28a and 28b show responses of an object to input commands which are accepted and not accepted, respectively;

FIG. 29 is a flow chart showing setting of an internal state of an object;

FIG. 30 shows an example of internal states of objects;

FIG. 31 shows an example of movement states of objects;

FIG. 43 illustrates production of bubbles by a ball model;

FIG. 44 illustrates production of spray by a ball model; such objects may be mixed. Further, a plurality of the same kinds of objects may be present. FIG. 3 shows an example of aquatic life which simulate dolphins. In FIG. 3, three objects Ob are shown by way of example.

Figure 3:
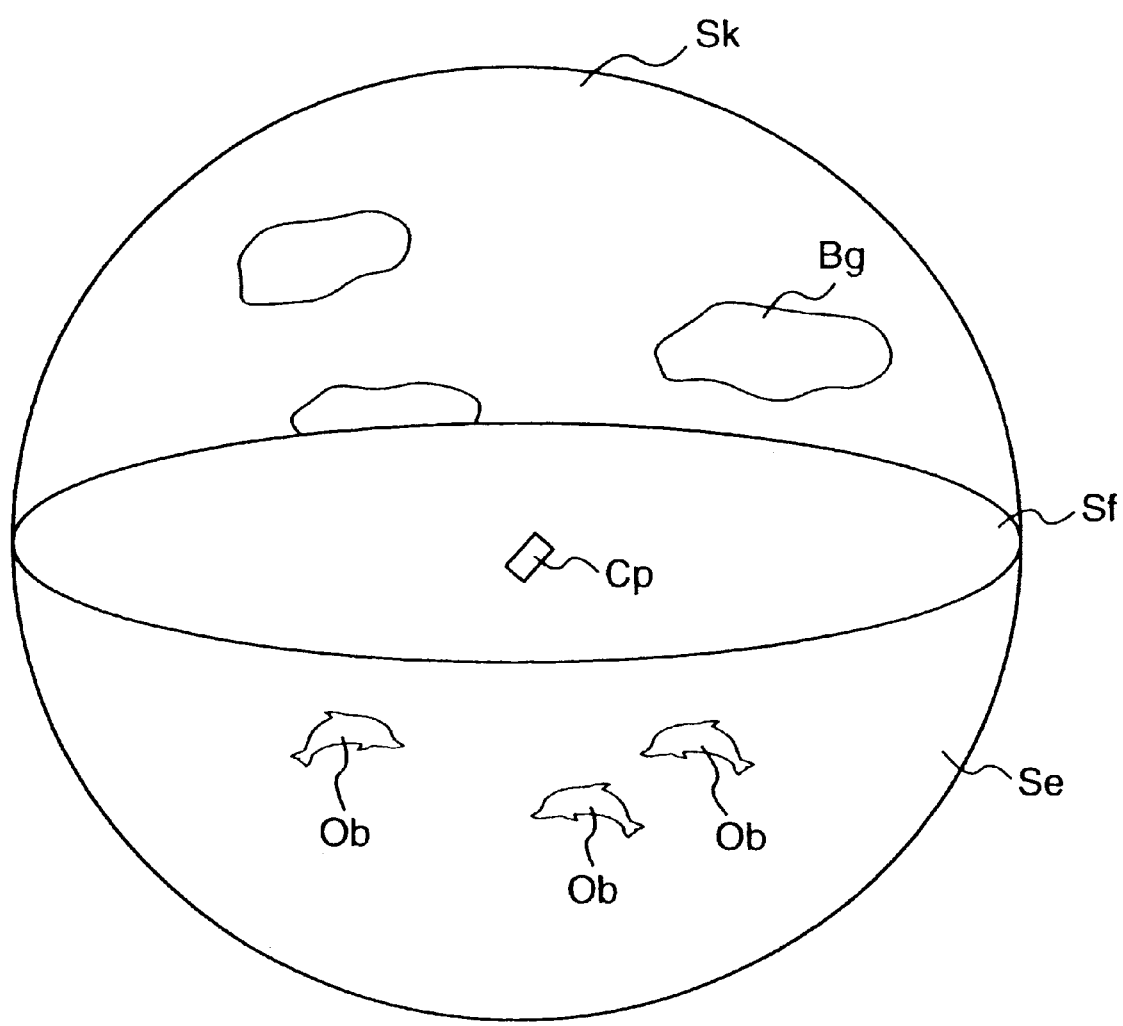
FIG. 3 is a perspective view showing an example of a virtual world to which the present invention is applied.

The environment is a place where the objects exist and may include, for example, the earth, another planet, a satellite, outer space and particular areas therein, the inner part of a building and a moving body or the like. For example, as shown in FIG. 3, space constituted by the sea Se and the sky Sk is given as the environment. Clouds are defined in the sky Sk as the background image Bg. An element of time can be included in the environment. For example, there is variation due to the lapse of time, more particularly, variation of seasons, variation due to aging and the like.

Further, a truly virtual environment may be constructed. For example, a specific assumption or limitation is provided in a physical law to thereby provide a world constituted by space defined so as to have a property which cannot exist normally. For example, there is space in which the velocity of light is extremely slow, space in which the gravity is remarkably different depending on a position and the like. It is a matter of course that actual configuration of the ground, spectacle and the like may be reflected. As an example, there is a navigation system.

The whole or part of the virtual world may be produced as the image. When the size of the virtual world is sufficiently large as compared with the size of the object, it is desirable that part of the virtual world is cut out to be displayed. In FIG. 45 illustrates production of water rings by a ball model; and FIG. 46 illustrates production of wakes by a ball model.

DESCRIPTION OF THE PREFERRED EMBODIMENTS

Figure 1:
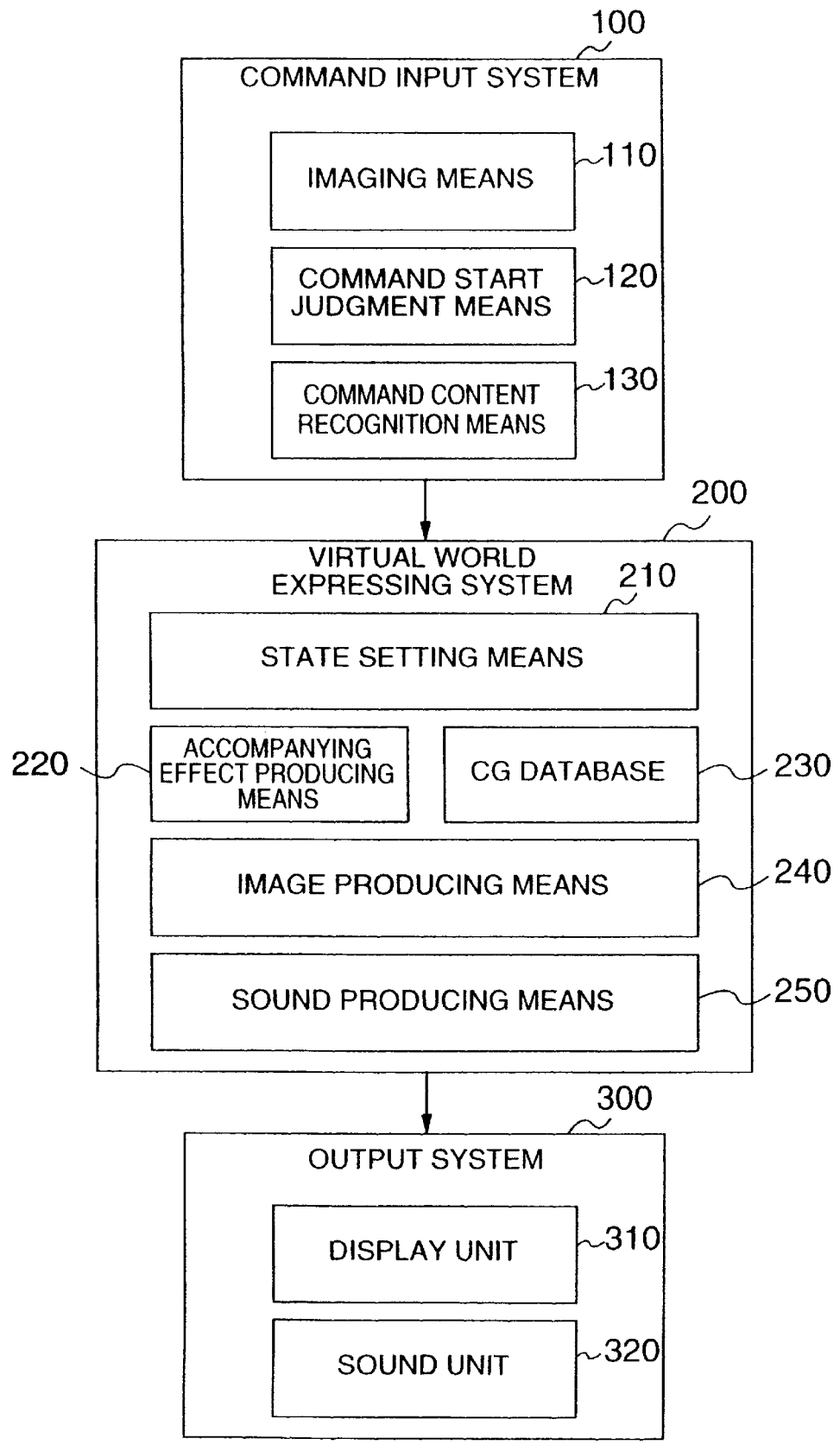
FIG. 1 is a block diagram illustrating a functional configuration of an image producing/displaying apparatus according to an embodiment of the present invention.

As shown in FIG. 1, an image producing/displaying apparatus according to an embodiment of the present invention comprises a virtual world expressing system 200 for producing an image and providing sound, a command input system 100 for inputting a command to the system 200, and an output system 300 for visualizing the image and producing the sound provided by the virtual world expressing system 200.

In the image producing/displaying apparatus according to the embodiment of the present invention, the virtual world expressing system 200 prepares a virtual world including at least one object and an environment where the object exists, and further produces an image for visually displaying at least part of the virtual world. The virtual world may be a truly virtual world or a model of the real world. For example, the virtual world as shown in FIG. 3 can be established. FIG. 3 is a conceptual diagram schematically illustrating an example of a virtual world. The output system 300 displays the produced image. Further, the image producing/displaying apparatus of the present invention inputs a command to the virtual world expressing system 200 through the command input system 100. The command is given by a gesture.

The object may be a person, an animal, a thing, an imaginary living thing, an artificially created imaginary living body or the like. It is a matter of course that more than one kind of this case, part to be visualized can be designated. For example, a camera can be set at a predetermined position of the virtual world, a position near to the object, a position of a visual point of the object, a position for tracking the object or the like. Further, cameras may be set so that the object can be viewed three-dimensionally.

Figure 4:
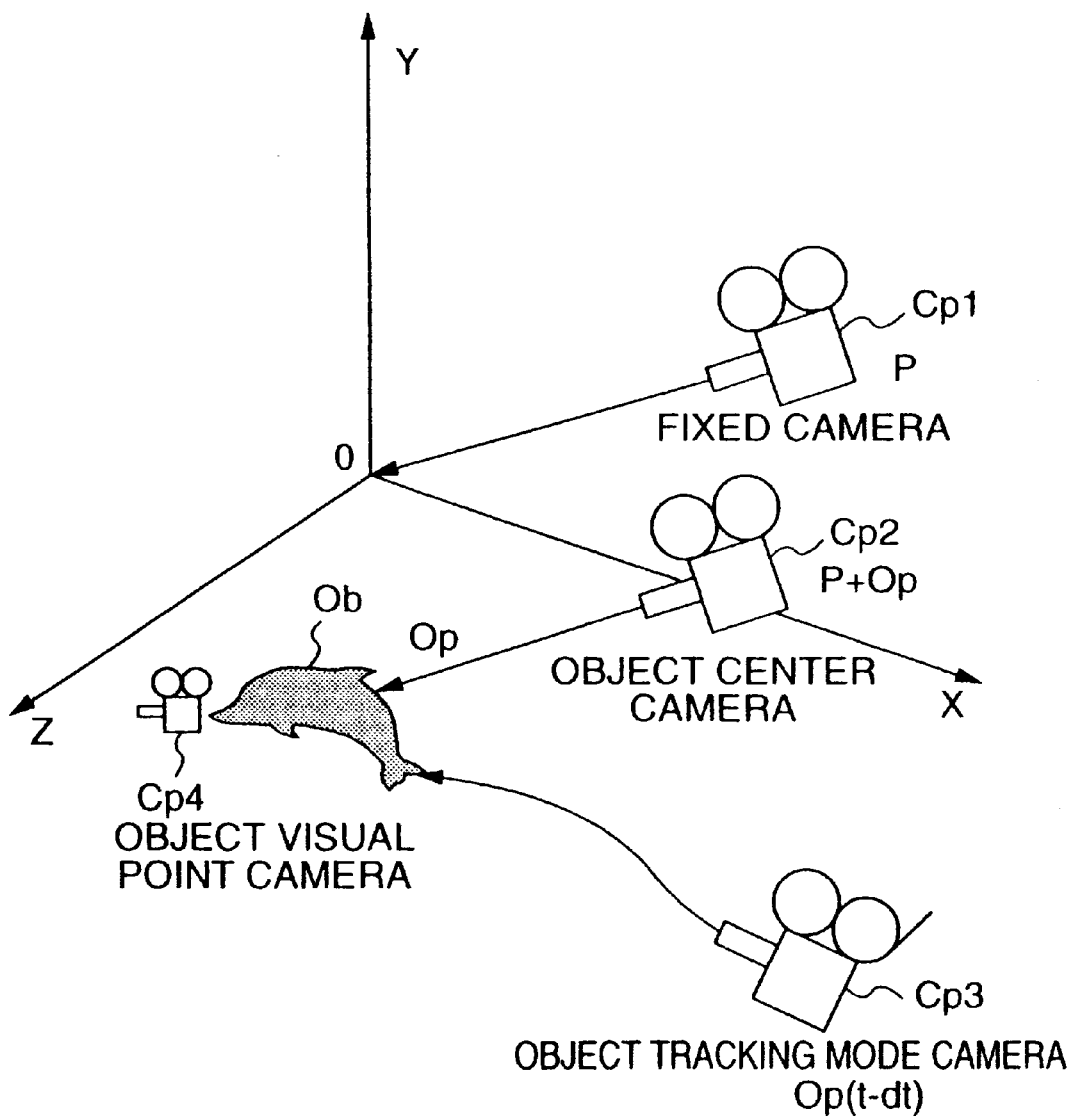
FIG. 4 is a diagram showing an example of positions of cameras for visualizing a virtual world.

FIG. 4 shows an example of positions of cameras. In the example of FIG. 4, there are provided four cameras including a fixed camera Cp1, an object center camera Cp2, an object tracking mode camera Cp3 and an object visual point camera Cp4. When an image is expressed, any of the cameras are designated to express an image of the virtual world from the visual point thereof. The fixed camera Cp1 has a position prescribed by virtual world coordinates in which the origin O of the virtual world is defined as a reference and is placed at a fixed position P separated by a fixed distance from the origin 0 of the virtual world. The direction of the camera Cp1 is directed to the origin O. The object center camera Cp2 is directed to a center position Op of the object Ob while maintaining the same distance in the same direction as those of the fixed camera Cp1. The object tracking mode camera Cp3 is placed at the center position op of the object Ob at time (t-dt) which is a past time by time dt from the center position Op of the object Ob at time t and is directed to track the object. The object visual point camera Cp4 is directed to a position ahead by a fixed distance in the movement direction of the object from the visual point of the object Ob (more particularly, the center position op of the object Ob, for example). Thus, the object can be observed at a user's desired visual point.

In the embodiment of the present invention, sound can be produced together with the image. The sound includes effect sound produced by the state of environment, sound produced by the object itself, music and the like. Further, the sound includes narration for explaining the virtual world, a guide message for indicating how to operate and the like. The sound produced by the object includes, for example, speech, emotion expressive sound, responsive sound indicative of a response and the like. The responsive sound includes, for example, sounds for expressing that the object can understand a command and sounds indicating that the object cannot understand a command. Further, as sound produced by mutual operation of an object and environment, there is shock sound produced when an object acts on environment, for example, sound produced when a marine animal jumps out from the water, shock sound produced when the marine animal splashes back into the water and the like. As sound itself, sound defined for the object can be used to produce a specific cry, for example. The addition of such sound can increase the reality of motion of an object. Further, when the speech, the emotion expressive sound or the like is produced, the user can desirably feel as if the user could talk with the object.

Portions of the embodiment of the present invention are now described with reference to the drawings.

The virtual world expressing system 200 comprises state setting means 210 for setting states of objects and environment included in the virtual world and cameras directed to them, and image producing means 240 for producing an image of the virtual world on the basis of information set in the state setting means 210. In the present invention, in addition to the constituent elements described above, the virtual world expressing system 200 further comprises, for example, accompanying effect producing means 220 for producing effects occurring incidentally to the environment in accordance with motion of the object in the virtual world, a CG database 230 for storing image data for producing the objects, the environment and the accompanying effects, and sound producing means 250 for producing sound.

Figure 2:
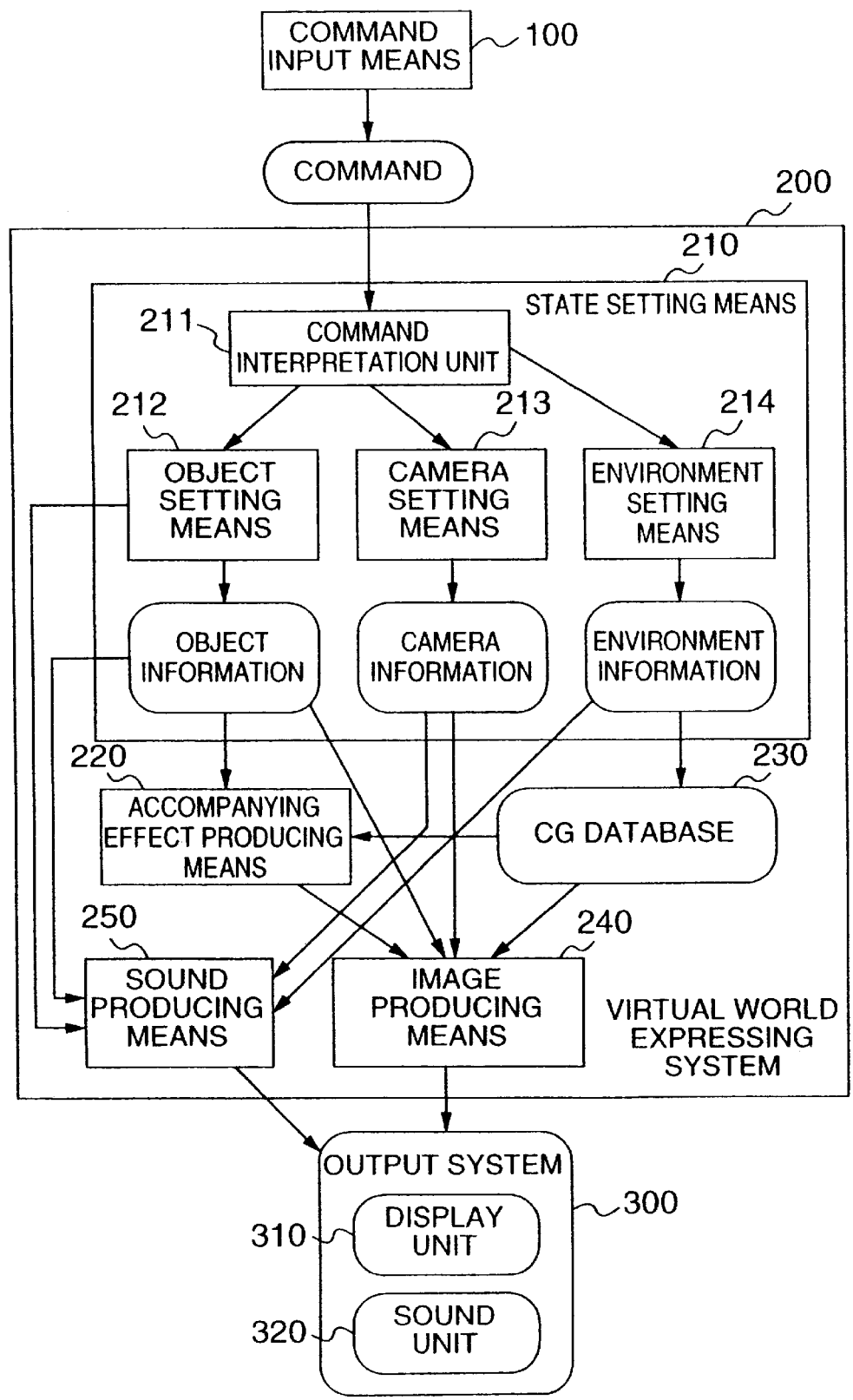
FIG. 2 is a block diagram illustrating a functional configuration of a virtual world expressing system according to an embodiment of the present invention.

The state setting means 210 comprises, for example as shown in FIG. 2, a command interpretation unit 211 which receives a command sent from the command input means 100 and interprets the command to determine which of the object, the environment and the camera the command is related to; object setting means 212 for producing a command for setting an object to a specific state, for example, object information for setting a position, a kind of movement or the like when the command is related to the object; camera setting means 213 for producing camera information for setting a position and a direction of a camera when the command is related to the camera; and environment setting means 214 for producing environment information for setting a state of environment such as background, time and weather when the command is related to the environment.

The object setting means 212 sets and modifies internal state information for each object which describes a state to which each object is to be set. The internal state information can be set to be updated when newly setting information and its set state are executed. However, when the newly set state does not interfere with execution of the state set so far, both the states may be provided together When the newly set state interferes with execution of the state set so far, for example, when an inconsistent command is given, the internal state is updated to the newly set state. Further, when the internal state information in which the object is set is used to proceed to execution of the relevant operation, the internal state information is reset. Accordingly, there is a case where nothing is set to part or all of the internal state information. In this case, the object is set to the movement state previously provided in the system. The internal state includes, for example, setting of various commands such as movement, turn, jump, rest, rotation and the like. In addition, information describing the degree of movement of the object such as magnitude of movement, velocity of movement and the like can be set as attribute information.

Further, the object setting means 212 can set information of sound produced by the object. The set sound information is sent to the sound producing means 250. Information indicative to object movement accompanying sound produced by movement of the object can be set as the object information. The information indicative of the object accompanying sound is supplied to the sound producing means 250. The object accompanying sound includes, for example, the sound of wind, sound of waves and the like.

The camera setting means 213 sets a position and a direction of cameras when the virtual world is observed. The camera position is set by a position defined in coordinates of X-axis, Y-axis and Z-axis constituting a virtual world coordinate system having the origin of the virtual world as a reference and inclinations α, β and γ in respect to the respective axes. Further, there are, for example, four kinds of camera positions as described above. Camera information includes information indicating whether a camera is set above the water or in the water. This is set because the effect sound is different depending on the position of the camera. The information indicating whether a camera is set above the water or in the water is supplied to the sound producing means 250.

The environment setting means 214 sets an environmental state in which the environment and the objects of the virtual world itself are set. There are various environmental states including intentional change and the like in addition to cyclic change, aging change, random change of the environment and the like. Since the effect sound is changed depending on the environmental state, information thereof is sent to the sound producing means 250.

Figure 5A:
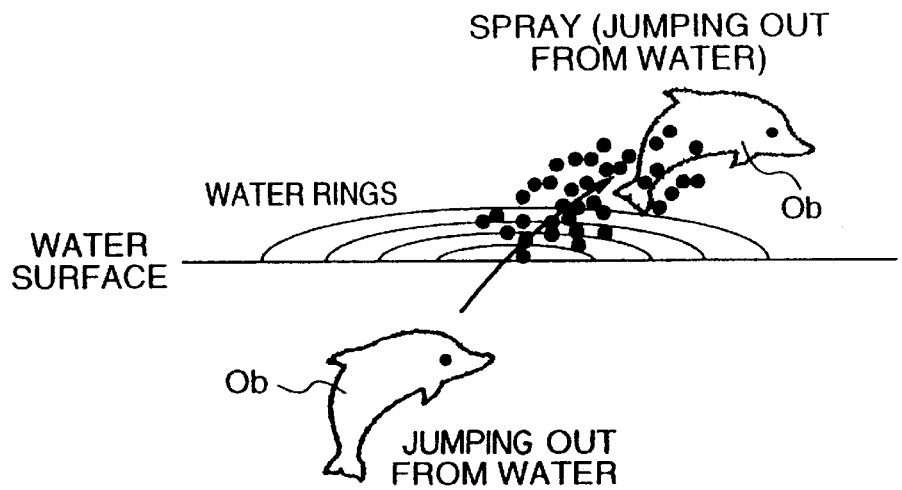
FIGS. 5a to 5c show an object jumping out from the water, jumping into the water and moving along the surface of the water, respectively, so as to illustrate examples of accompanying effects produced in environment by motion of the object in a virtual world.
Figure 5B:
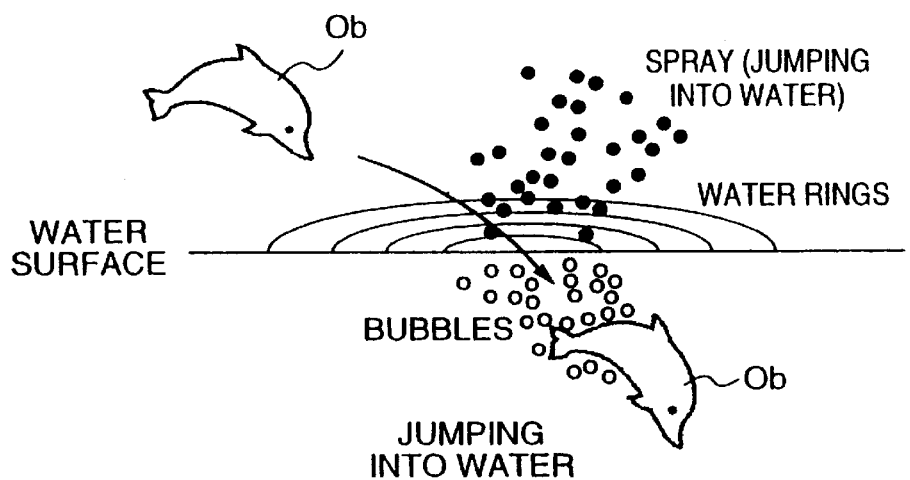
Figure 5C:
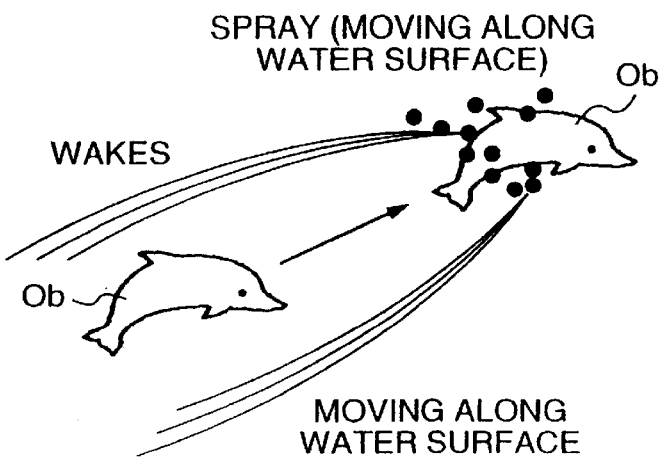

The accompanying effect producing means 220 receives the object information and produces change that movement of the object gives to part of the environment. For example, spray, water rings, bubbles or the like produced when a marine creature constituting an object jumps out from the water and returns into the water or wakes or the like produced when the object moves near the surface of the water are produced in order to express local change produced in the environment due to movement of the object. The reality of movement of the object can be increased by the accompanying effect. FIGS. 5a to 5c show examples of the accompanying effects. FIG. 5a shows spray and water rings produced when the object Ob jumps out from the water. FIG. 5b shows spray, bubbles and waterrings produced when the object Ob jumps into the water. FIG. 5c shows wakes and spray produced when the object Ob moves along the surface of the water or near the surface of the water.

The CG database 230 stores basic data used when the objects, the environment and the accompanying effect are expressed by images.

Data concerning the object of the basis data include data for indicating a basic form and movement of each object, for example, form data such as skeleton and external form and motion data indicating motion of each portion upon movement, and attribute information provided in the object, for example, weight, color, character, aging change information and the like. The aging change information is information which prescribes change of age of the object, for example. More particularly, the aging change information includes information for aging the object in accordance with change of time and information which defines items changing together with aging. The items include, for example, size, weight, color and character of a form.

Figure 7A:
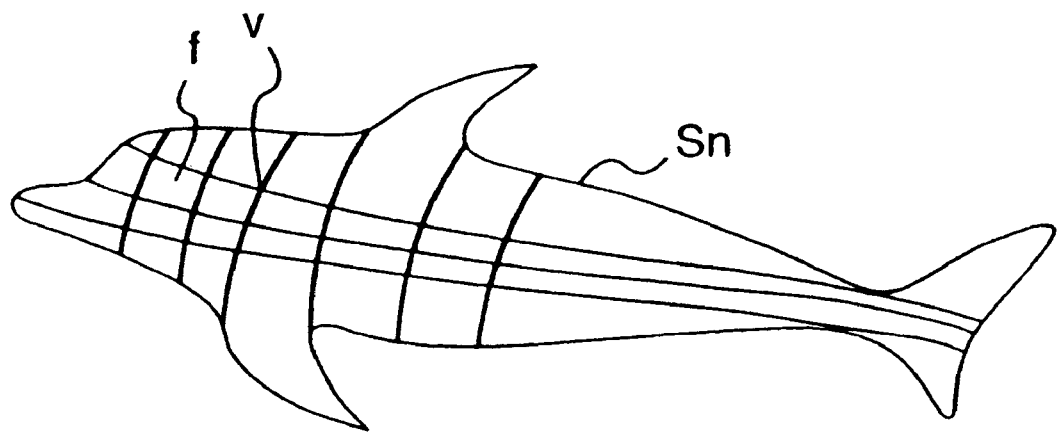
FIGS. 7a and 7b illustrate a polygonal model for expressing a form of an object and a skeleton structure of the object, respectively.
Figure 7B:
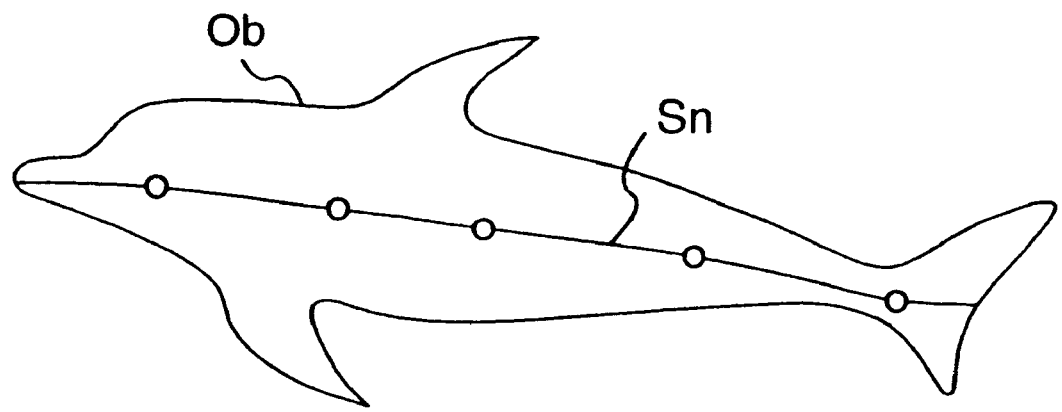
Figures 8A, 8B:
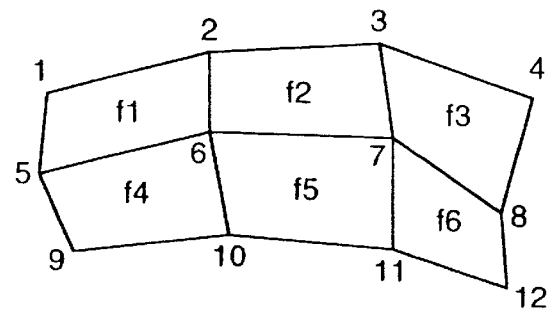
FIGS. 8a and 8b show a detailed polygonal model and a correspondence relation of data of the polygonal model and a skeleton, respectively.

The form data includes shape data expressing an external surface of the object Ob by a polygon f approximately as shown in FIGS. 7a, 8a and 8b and skeleton data for prescribing a skeleton Sn of the object for determining the whole form of the object Ob as shown in FIG. 7b. The shape data includes, as shown in FIG. 8b, definition of vertexes V constituting polygons f1, f2, f3, . . . , coordinates of the vertexes V expressed by a local coordinate system of the object Ob, and data expressing a relation ratio of the vertexes V to movement of bones constituting the skeleton Sn.

Figure 9A:
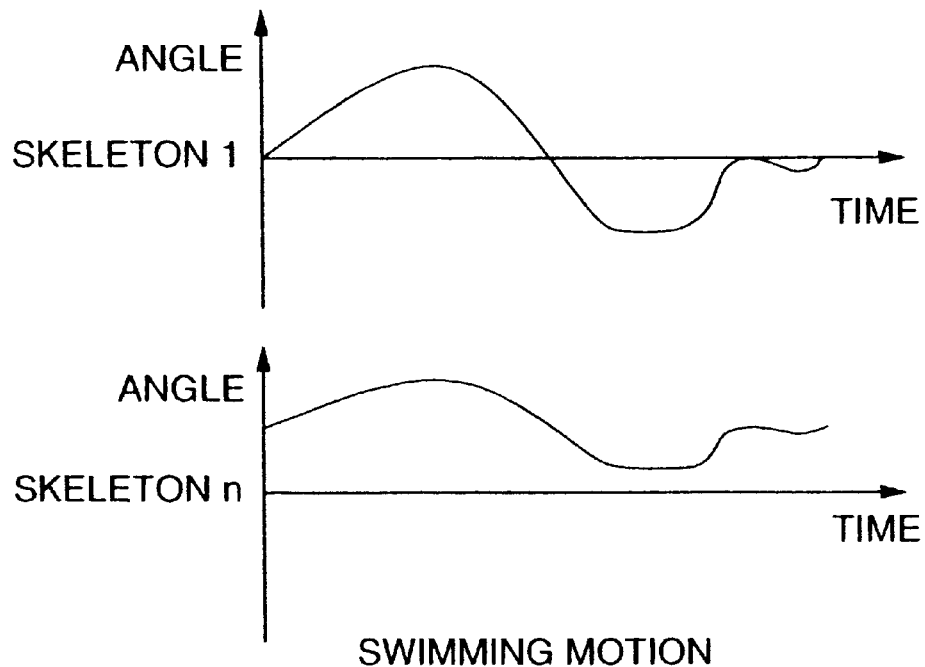
FIGS. 9a and 9b are graphs showing angles of skeleton versus time in basic motion when an object swims and turns, respectively.
Figure 9B:
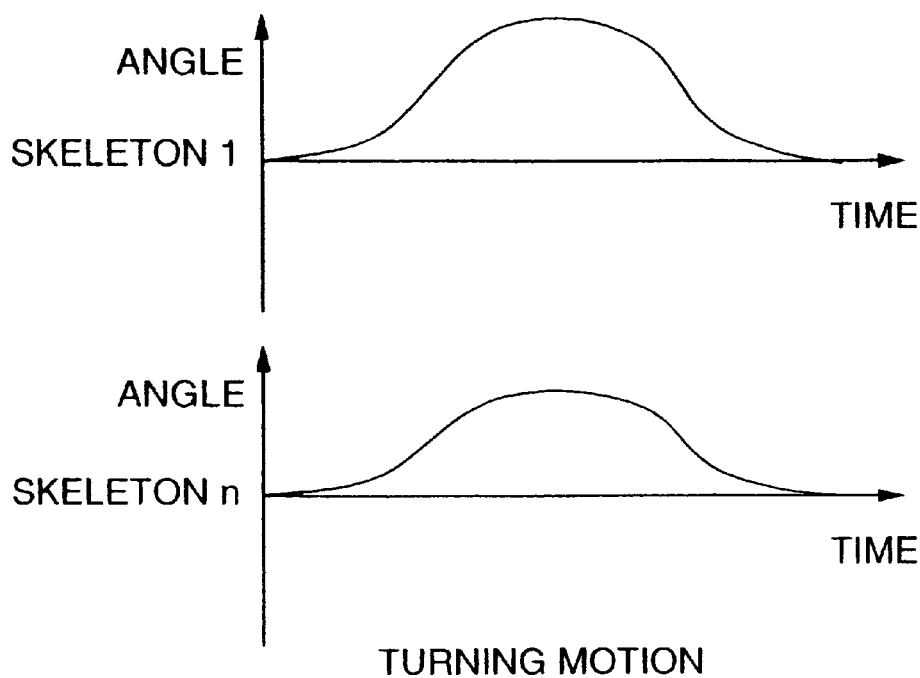

The motion data includes information representing angles of bones (skeleton 1, . . . , skeleton n) of the skeleton with respect to movement of the object versus time as shown in FIGS. 9a and 9b. FIG. 9a shows a basic motion of an object when the object swims, and FIG. 9b shows a basic motion of an object when the object turns.

Data concerning environment includes time information indicating time of the virtual world, information expressing natural phenomena in the environment, information expressing a secular change of the environment, and image changing information representing how the environment is expressed as an image in accordance with the aforementioned information. The time information includes, for example, calendar information, time and the like defined in the virtual world. The information expressing the natural phenomena in the environment includes information of phenomena such as weather changing suddenly, information of phenomena such as an earthquake, eruption of a volcano and the like which occur rarely, information indicating the time setting, for example, such as change of the seasons, change in a day, and the like. The image changing information includes, for example, information representing that the image is brightened from dawn to sunset and is darkened from sunset to dawn in a day, and information representing change of spectrum of illumination for illuminating the environment.

Figure 6:
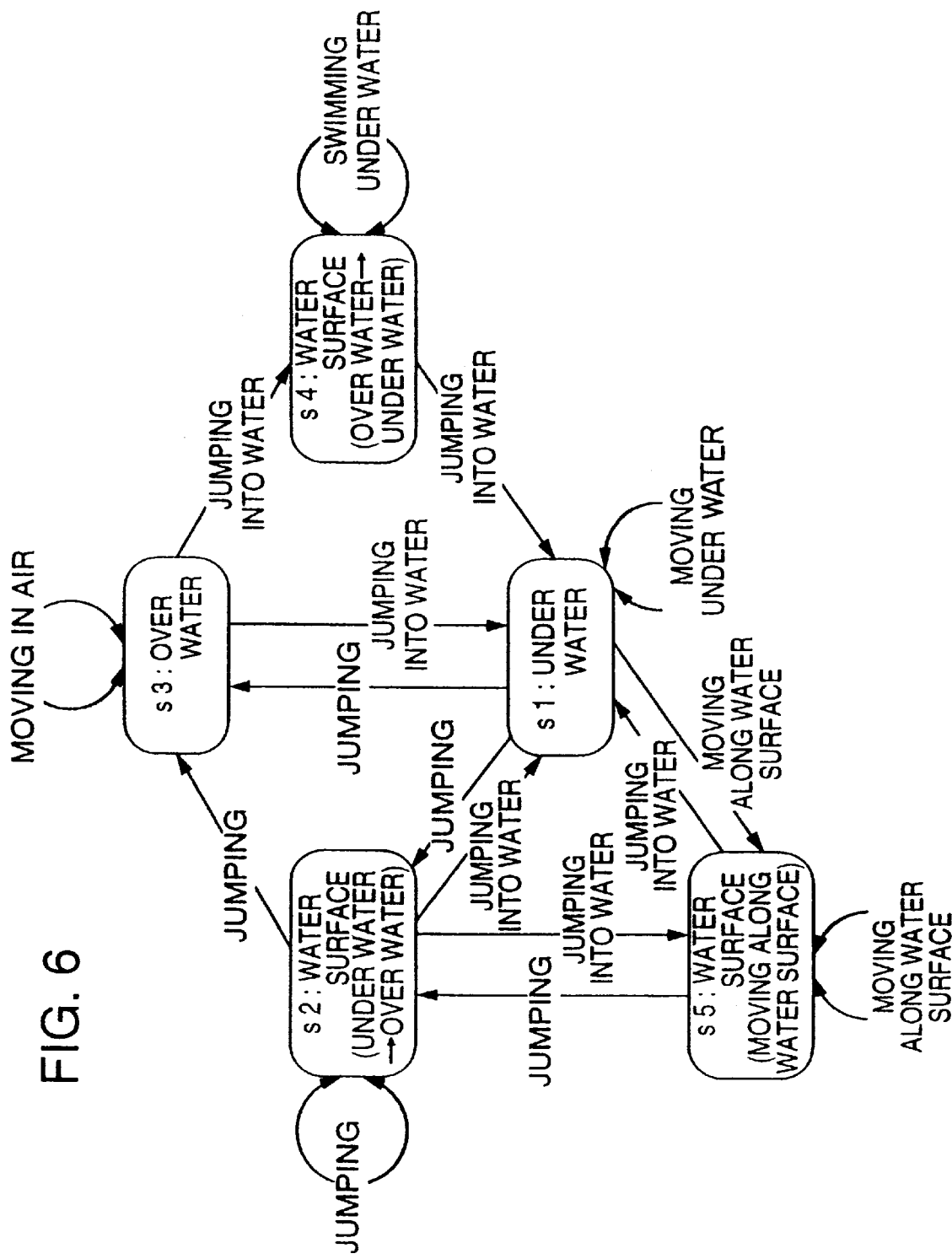
FIG. 6 shows the correspondence relation of state transition and accompanying effects of an object in a virtual world.

Data concerning the accompanying effect includes change pattern for local change of environment to be produced by movement of the object, image elements for producing the local change, and physical laws for producing the accompanying effect. The change pattern includes, for example, as shown in the state transition diagram of FIG. 6, data indicating correspondence of the accompanying effect accompanied with movement of the object. The image elements include, for example, basic image data for producing spray, water rings, wakes and the like as shown in FIG. 6. The physical laws include laws for describing production and transmission of waves on the surface of water, the equation of motion indicating scattering of spray, and the like.

The image producing means 240 obtains states of the object, the environment and the accompanying effect in the respective near future and produces images on the basis of the obtained states instantly to synthesize them. The images are produced successively to form an animated image as a whole. A still image may be formed. The image producing means 240 stores data for producing the currently displayed image and information relative to the motion of the object when any object setting information is not designated. The information relative to the motion of the object when any information is not designated may be stored in the CG database 230.

The image producing means 240 obtains the states of the object in the near future on the basis of the object information set in the object setting means 212 and produces the image of the object with reference to the information in the near future and the camera information. Further, a state of an upcoming environment designated by the environment information is obtained with reference to the CG database 230 and an image of the environment is produced with reference to the camera information. Furthermore, an image with respect to the accompanying effect produced by the accompanying effect producing means 220 is produced with reference to the camera information. The state of the object is determined on the basis of the previously defined equation of motion and the object information. For example, when the object jumps out from the surface of the water, a velocity and an angle necessary for the object to jump out from the water are obtained and a falling track of the object above the water is obtained to calculate a position in which the object jumps into the water and a velocity when the object jumps into the water. A next state of the image is determined based on the above information.

The sound producing means 250 produces sound information such as sound produced by an object, background sound, narration, guide message, music and the like in accordance with a state of the object. As to the sound produced by the object, the narration and the guide message, for example, previously recorded or synthesized phonemic piece data and data for designating combined phonemic pieces for producing sound in accordance with expression such as speech, emotions, responsive sound, narration, guide message and the like are recorded in a library (not shown). The background sound and music can be produced by previously recording sound suitable for the environment and preserving the sound as a library of sound to reproduce the sound if necessary. When a position is related to a sound producing source, data indicating the position is also recorded. Further, the library may be provided in the CG database 230.

The output system 300 includes a display device 310 for displaying an image and a sound device 320 for producing sound. The display unit 310 can be composed of a large screen and a projector for projecting an image on the large screen when a large picture is displayed. It is a matter of course that the display unit can be structured by a multi-vision system composed of a plurality of display units. Further, a usual CRT display or a liquid crystal display can be used to display an image. Furthermore, the sound unit 320 includes audio amplifiers and loudspeakers of at least two channels so that stereo reproduction can be attained. It is a matter of course that multi-channel type audio amplifiers and loudspeakers can be used in order to reproduce stereo sound.

The output system 300 can use a head mounting display (HMD) constructed to be mounted on the user's head and display an image in front of the user's eyes. In this case, a sensor for detecting rotation of the user's neck is provided to thereby detect a direction of the user's eyes so that a direction of a camera can be set on the basis of the detected direction of the user's eyes. By using such an output system, the user is made to feel as if he/she is actually in the water, thus increasing the realism of the virtual world. Further, the sound unit 320 can include a headphone.

The command input system 100 takes an image of a gesture of a commander or instructor, for example, and recognizes a command included in the gesture. However, the command input system 100 does not grasp the gesture itself as a whole. The system detects a movement state of a specific pixel pattern moving with the gesture to extract a feature quantity from the movement state so that the command is recognized on the basis of the feature. The reason why the specific pixel pattern is detected is that burdensome analysis of an image required to recognize the whole gesture is avoided and further a start point of the command can be recognized easily. Furthermore, the movement state typically includes a locus, for example. In addition, the moving velocity of the pixel pattern, magnitude of a range of space in which the locus is described and the like can be illustrated.

More particularly, in the present invention, the commander holds a light emitting member, for example a penlight, in hand and moves a light emitting point of the penlight so that a predetermined gesture pattern such as circle, vertical swing, horizontal swing, FIG. 8, wave or the like is described in space while the penlight is lit. The gesture patterns are not limited to two dimensions but may be three dimensional, as well.

The reason why the light emitting member such as a penlight is used is that the start and end of the command can be clarified by turning on and off the light emitting member. Accordingly, in the image processing operation, a tool for giving a command is not limited to the light emitting member as far as it can clarify at least the start. For example, an area having a large reflectance is provided in a part and when a command is given, the area is exposed, and when a command is not given, it is not exposed. More particularly, for example, the tool can be realized by coating a part of a finger of a globe with fluorescent paint so that when a command is given, the finger coated with the paint is raised straight and when a command is not given, the finger is bent. Further, a baton having an end coated with a specific color is provided and when a command is given, the end is exposed, and when a command is not given, the end is covered.

Figure 10:
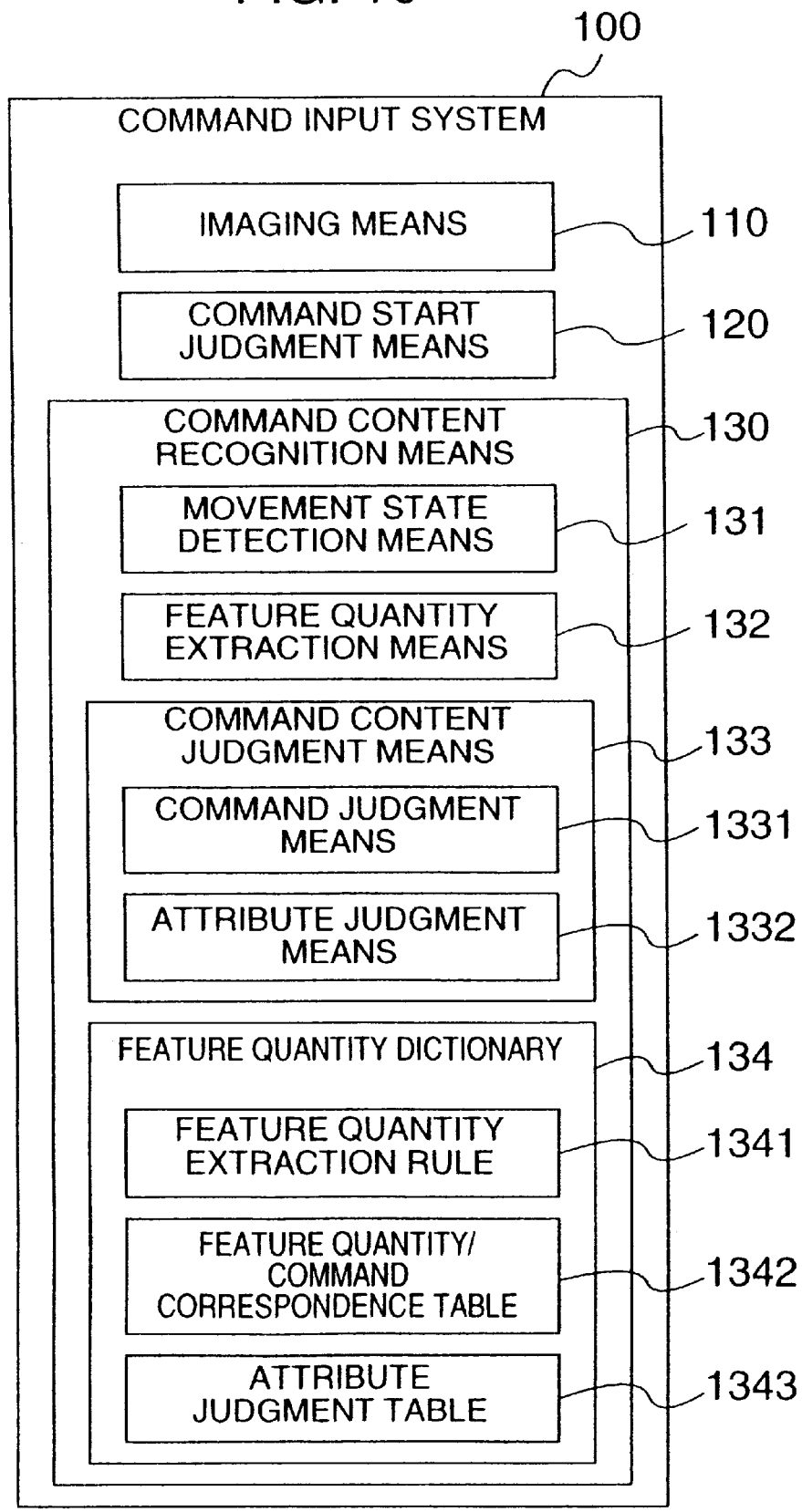
FIG. 10 is a block diagram illustrating a functional configuration of a command input system according to an embodiment of the present invention.

The command input system includes, for example, as shown in FIG. 10, imaging means 110 for taking an image of fixed space, command content recognition means 130 for recognizing contents of a command on the basis of the taken image and notifying the contents of the command to the virtual world expressing system, and command start determination means 120 for determining start of a command. The command start determination means 120 may be omitted when the start of a command is clear, when it is not necessary to clarify the start of a command, and the like.

The imaging means 110 includes, for example, an imaging unit for taking an image in serial time manner and an image processing unit for processing the taken image to produce desired image data. The imaging unit can use at least one video camera, for example. Preferably, two cameras are used. By using two cameras, a command issued in space can be grasped in three dimensions. The image processing unit includes a processing device for emphasizing a desired specific pixel pattern and an analog-to-digital converter. Further, when two cameras are used, a device for processing images of the two cameras to combine the images into one frame can be used.

Figure 11:
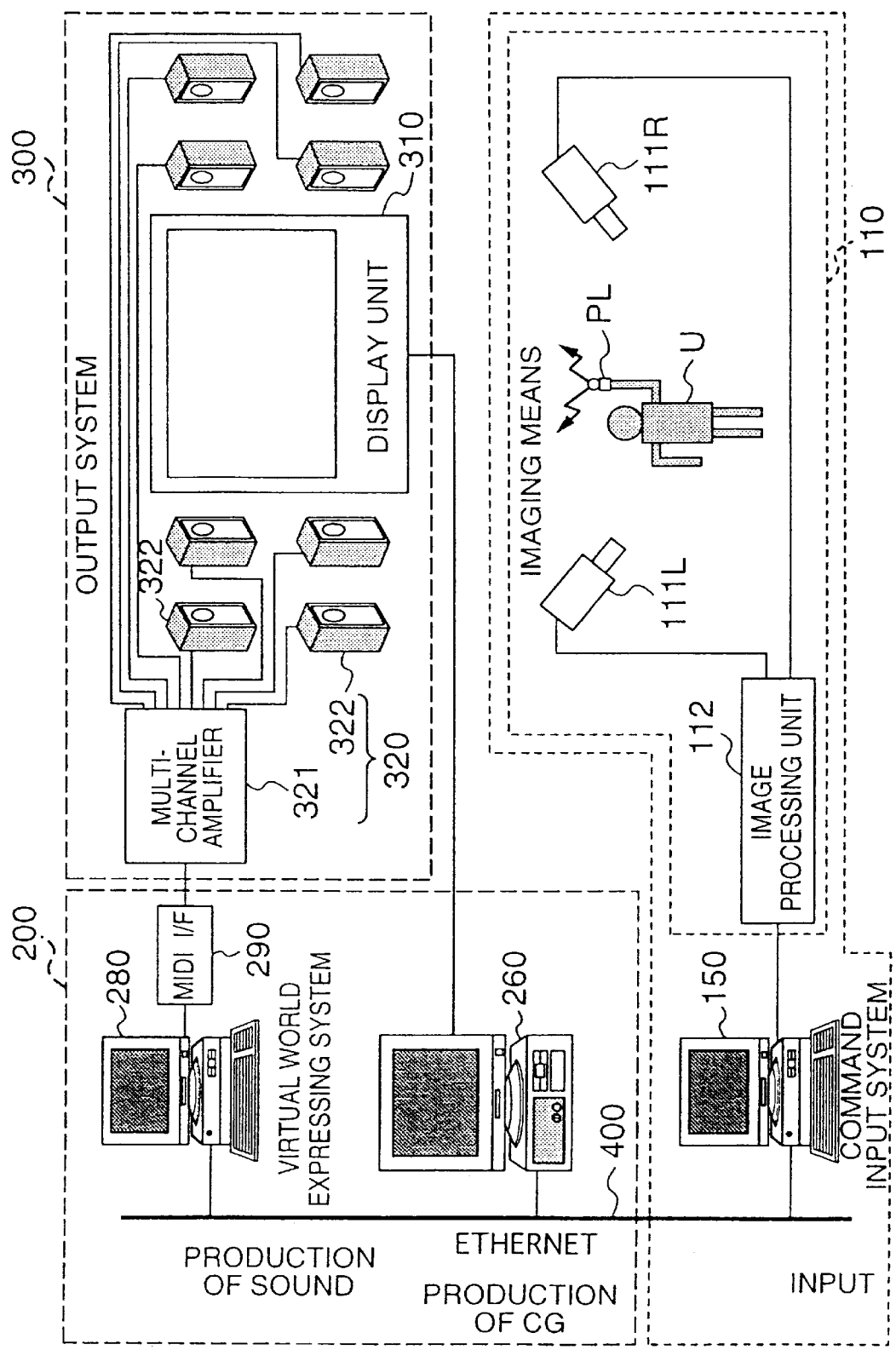
FIG. 11 is a schematic diagram illustrating a hardware resource configuration which can be used for implementation of the present invention.

FIG. 11 illustrates an example of the image taking means. The imaging means shown in FIG. 11 includes two imaging devices 111L and 111R, and an image processing unit 112 for processing the image to produce desired image data.

The command content recognition means 130 and the command start determination means 120 are both constituted by an information processing unit. More particularly, for example, they are composed of memory means for storing serial time image obtained in the imaging means and a software including a procedure for realizing the respective means. The command start judgment means 120 extracts a specific pixel pattern from images of a plurality of frames formed by the imaging means 110 and determines the start of a command when the specific pixel pattern is extracted. The command content recognition means 130 includes, for example as shown in FIG. 10, movement state detection means 131 for extracting movement of the specific pixel pattern from images of the plurality of frames formed by the imaging means 110 and detecting movement state, feature quantity extraction means 132 for extracting a feature quantity from the detected movement state, command content determination means 133 for determining contents of a command on the basis of the feature quantity, and a feature quantity dictionary 134 used for extraction of the feature quantity and determination of the command. The command content determination means 133 includes command determination means 1331 for determining the command corresponding to the feature quantity with reference to the feature quantity dictionary, and attribute determination means 1332 for determining an attribute with reference to the feature quantity dictionary. The feature quantity dictionary 134 includes a feature quantity extraction rule 1342 which defines a rule used based upon extraction of the feature quantity, a feature quantity/command correspondence table 1342 indicating a correspondence relation of the feature quantity and commands, and an attribute determination table 1343 indicating a correspondence relation of the feature quantity and the attribute.

The embodiment of the present invention is now described in more detail.

FIG. 11 schematically illustrates a hardware system constituting the image producing/displaying apparatus according to an embodiment of the present invention.

The hardware system shown in FIG. 11 includes the virtual world expressing system 200, the command input system 100, and the output system 300. These systems 100, 200 and 300 are connected through a network system 400, for example, such as the ethernet and can transmit and receive information from each other. In FIG. 11, the command input system 100 includes cameras 111L and 111R constituting the imaging means 110, the image processing unit 112, command content recognition means 130 for recognizing contents of a command on the basis of the image input from the image processing unit, and an information processing unit 150 for realizing the command start determination means 120. The virtual world expressing system 200 includes a computer graphics producing unit (hereinafter referred to as a CG producing unit) 260 which is an information processing unit which produces an image and outputs RGB signals, an information processing unit 280 for producing sound, and a musical instrument digital interface (MIDI I/F) 290. The output system 300 includes a multi-channel amplifier 321, and a plurality of loudspeakers 322 corresponding to multi-channels.

The cameras 111L and 111R are disposed at upper front right and left oblique positions of the user U to be directed to the upper half of the body of the user U. Further, the display device 310 is in front of the user U. In addition, the loudspeakers 322 surround the user U. The loudspeakers are disposed in a place having a soundproof wall, for example a studio.

Figure 12:
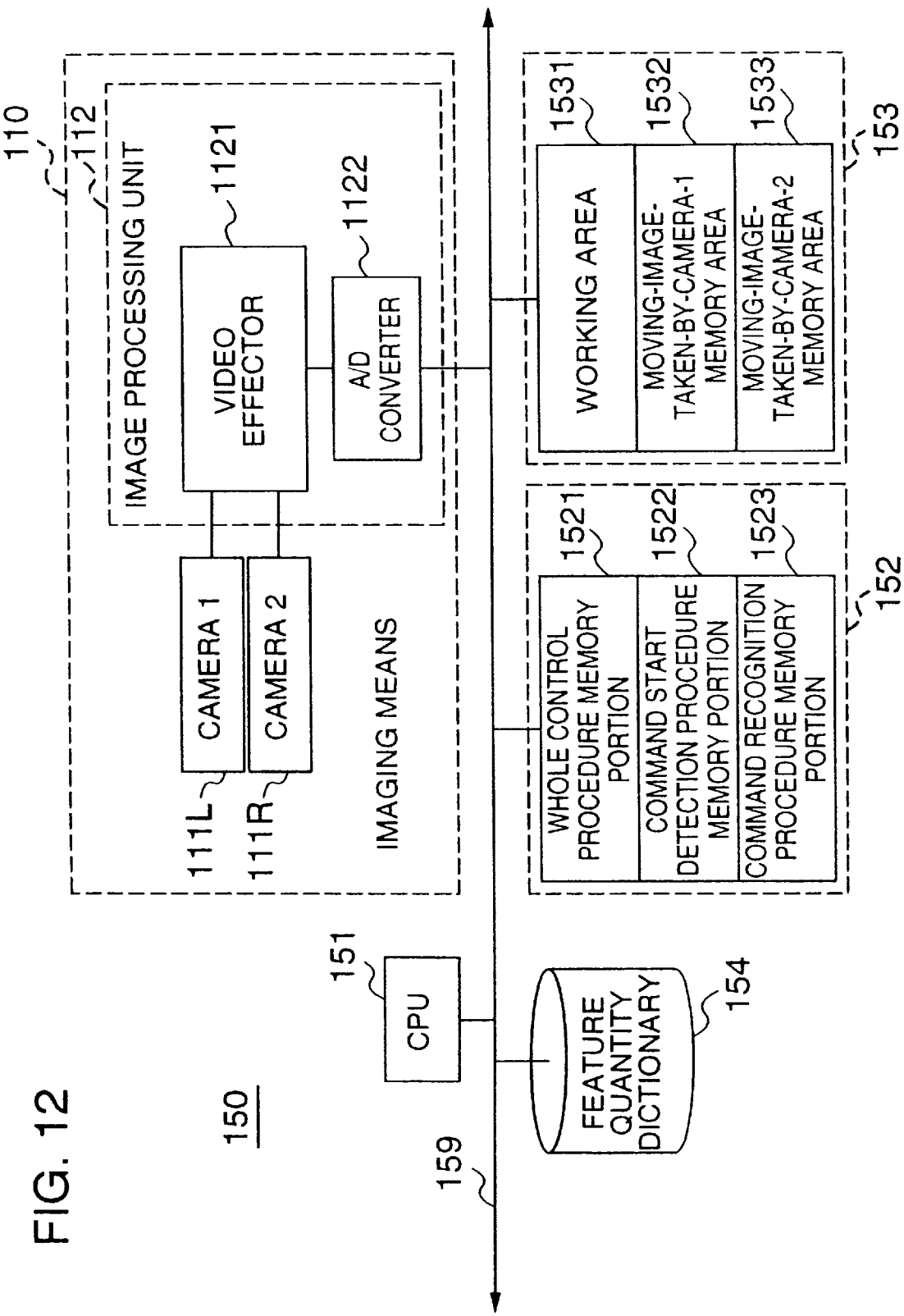
FIG. 12 is a block diagram illustrating a hardware system of an information processing unit constituting a command input system according to an embodiment of the present invention.

More particularly, the command input system 100 is configured by hardware as shown in FIG. 12, for example. That is, the imaging means 110 includes the cameras 111L and 111R, a video effector 1121 for emphasizing a specific pixel of the image obtained from the cameras, and an A/D converter 1122 for converting the images obtained from the cameras into digital data. Further, the information processing unit 150 includes a CPU 151 for executing a command input process in accordance with a stored program, a memory 152 for storing various commands executed by the CPU 151, a memory 153 for storing taken image data, work data and the like, and an external storage 154 for storing the feature quantity dictionary. The CPU 151, the memories 152 and 153, the external storage 154 and the A/D converter 1122 are connected to one another through a bus 159. The memory 152 includes a whole control procedure memory portion 1521 for storing a control procedure for controlling the whole system, a command start detection procedure memory portion 1522 for storing a procedure for detecting a start of a command, and a command content recognition procedure memory portion 1523 for storing a procedure for recognizing contents of a command. Further, the memory 153 includes a working area 1531, a moving-image-taken-bycamera-1 memory area 1532 for storing a plurality of frames of images taken by the camera 111L, and a moving-image-taken-by-camera-2 memory area 1533 for storing a plurality of frames of images taken by the camera 111R.

Figure 25:
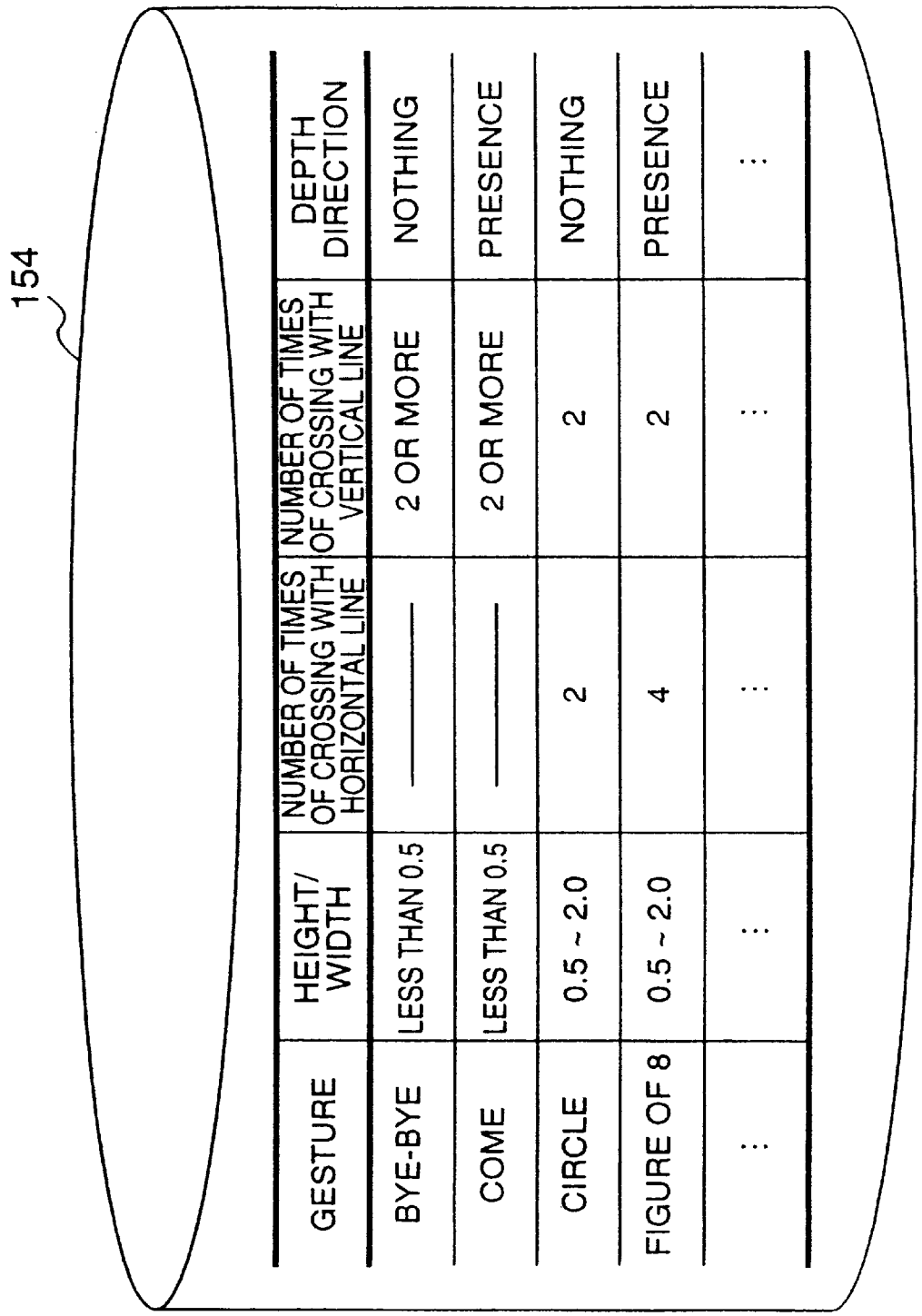
FIG. 25 shows a configuration of a feature quantity dictionary prescribing various values for 5 feature quantities extracted from gestures.

Feature quantities for each gesture are prescribed in the feature quantity dictionary. For example, as shown in FIG. 25, as the feature quantity of a circle, it is prescribed that a ratio of height/width of the circumscribed rectangle is "0.5 to 2.0", the number of crossing horizontal lines is "2", the number of crossing vertical lines is "2", and a depth direction is "nothing".

Figure 13:
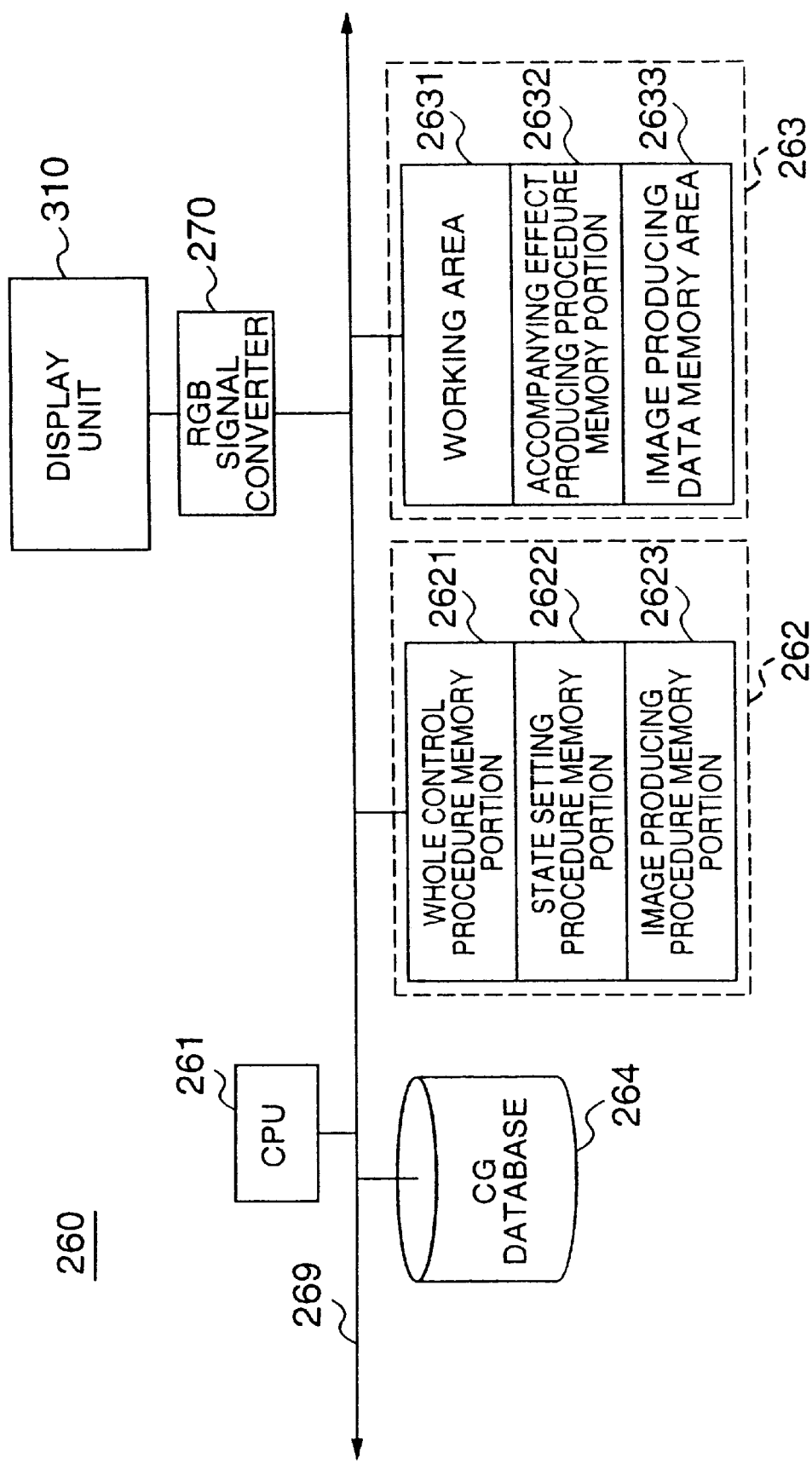
FIG. 13 is a block diagram illustrating a hardware system of a computer graphics producing apparatus constituting a virtual world expressing system.
Figure 14:
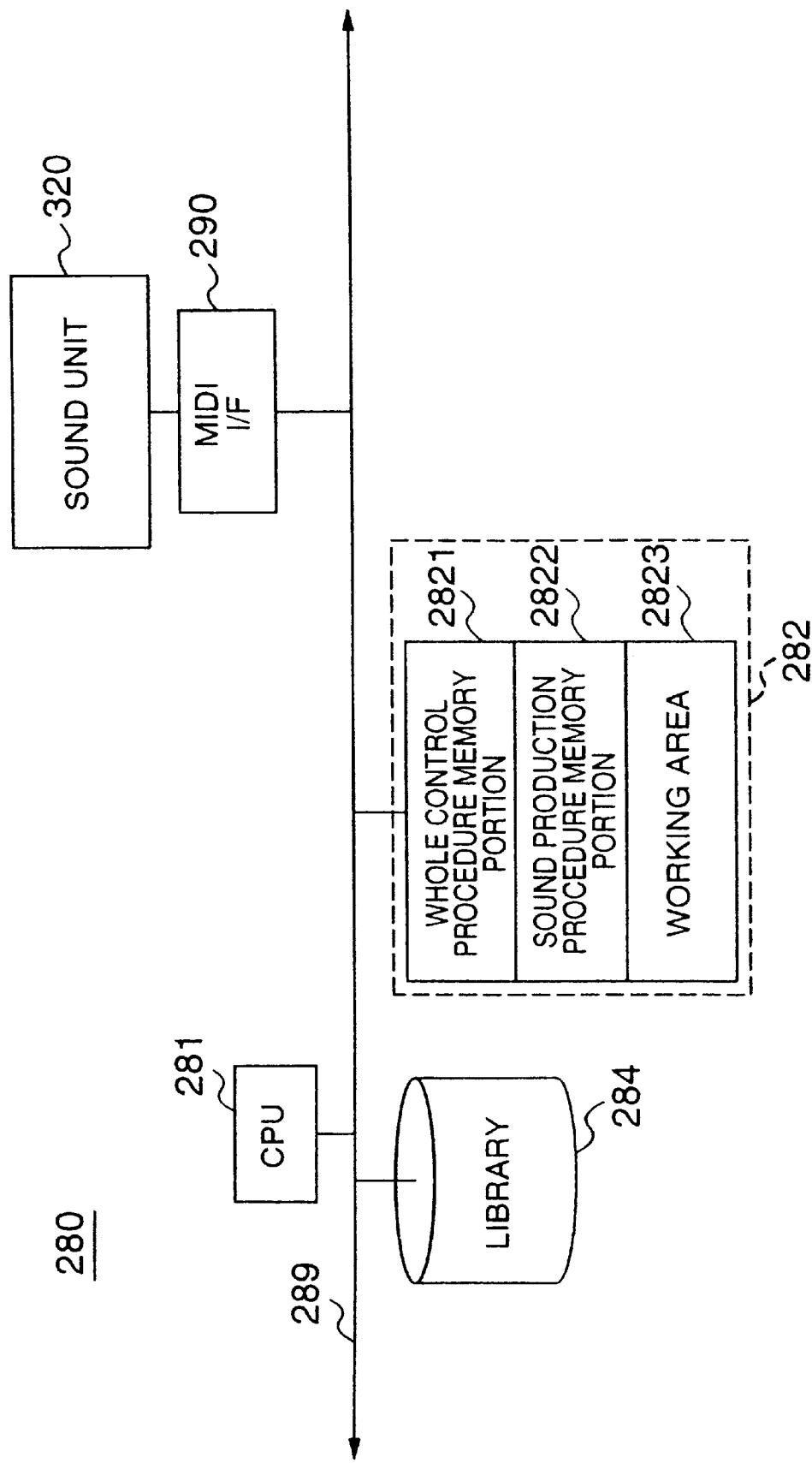
FIG. 14 is a block diagram illustrating a hardware system of an information processing unit constituting a sound producing system.

More particularly, the virtual world expressing system 200 includes the CG producing unit 260 shown in FIG. 13 and the information processing unit 280 shown in FIG. 14.

The CG producing unit 260 includes, as shown in FIG. 13, a CPU 261 for executing a command input process in accordance with a stored program; a memory 262 for storing various commands executed by the CPU 261; a memory 263 for storing taken image data, work data and the like; an external storage 264 for storing image data for constituting the CG database 230; and an RGB signal converter 270. The CPU 261, the memories 262 and 263, the external storage 264 and the RGB signal converter 270 are connected to one another through a bus 269. The memory 262 includes a whole control procedure memory portion 2621 for storing a control procedure for controlling the whole system, a state setting procedure memory portion 2622 for storing a procedure for setting states, and an image producing procedure memory portion 2623 for storing a procedure for producing an image. Further, the memory 263 includes a working area 2631, an accompanying effect producing procedure memory portion 2632 for producing accompanying effects, and an image producing data memory area 2633 for storing data for producing an image. The image producing data memory area 2633 stores past data for a plurality of frames as well as data for producing an image to be displayed next. Each time new data is stored therein, the oldest data is discarded.

The information processing unit 280 includes, as shown in FIG. 14, a CPU 281 for executing a command input process in accordance with a stored program, a memory 282 for storing various commands executed by the CPU 281, an external storage 284 for storing sound data for constituting a library, and a musical instrument digital interface (MIDI I/F) 290. The CPU 281, the memory 282, the external storage 284 and the musical instrument digital interface (MIDI I/F) are connected to one another through a bus 289. The memory 282 includes a whole control procedure memory portion 2821 for storing a control procedure for controlling the whole system, a sound producing procedure memory portion 2822 for storing a sound producing procedure for producing sound, and a working area 2823.

In the hardware system of FIG. 11, the virtual world expressing system 200 uses two information processing units and the command input system 100 uses one information processing unit. However, the number of information processing units used in the present invention is not limited. For example, the virtual world expressing system 200 can use one information processing unit. Further, the virtual world expressing system 200 and the command input system 100 can be constituted by one information processing unit. Furthermore, each system may be broken down into components and include more information processing units in a distributed manner.

The image producing/displaying apparatus is now described together with operation thereof. In the following description, as shown in FIG. 3, a virtual world is assumed in which dolphins are used as objects Ob, and the sea Se and the sky Sk exist as environment. Further, two cameras are utilized for taking an image of inputting a command.

First of all, the operation of inputting a command is described.

Figure 21:
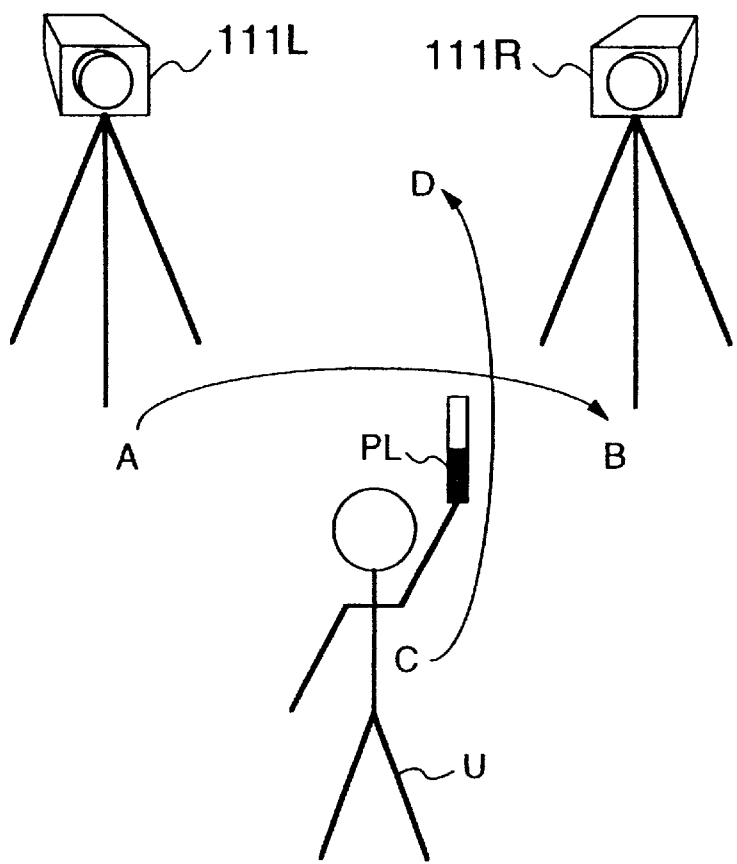
FIG. 21 shows two cameras for taking an image of a gesture made by a user.

As shown in FIGS. 11 and 21, the inputting operation of inputting a command is performed by lighting a penlight PL held by the user U in hand and making a gesture so that the penlight PL is swung to express any of predetermined command operations.

Figure 15:
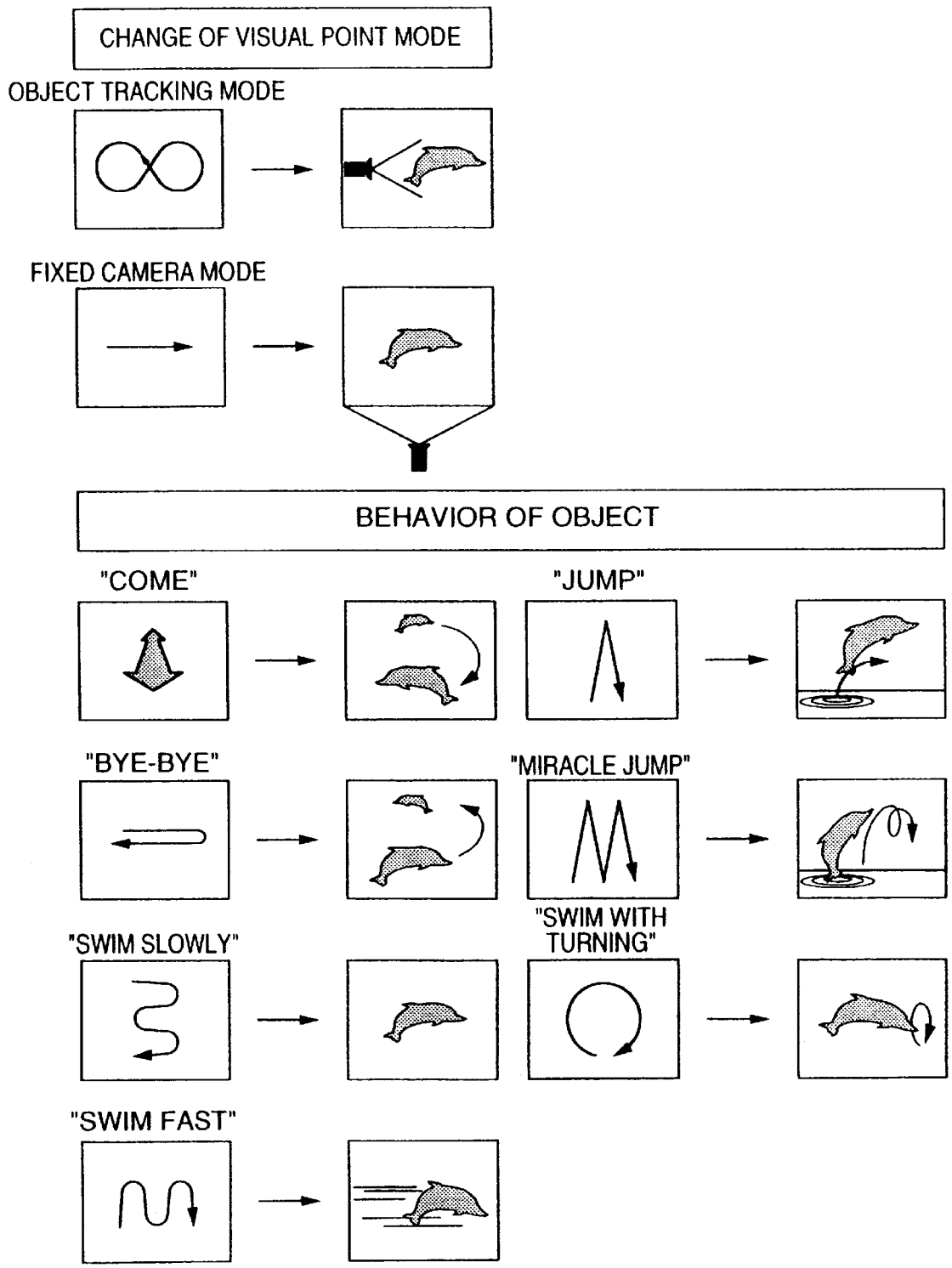
FIG. 15 shows a relation of loci of light points of a penlight swung in accordance with a gesture and commands.

Command gestures are now described. The command by a gesture includes a command for setting the cameras shown in FIG. 4 as well as a command for the object. FIG. 15 shows the relation of loci of light points of the penlight PL swung by the gestures and contents of commands. How to select loci of the light points and the correspondence relation of the loci and the contents of the commands are defined freely. However, there is an advantage that a gesture for a command can be memorized easily by selecting a locus corresponding to motion of the object. What command can be given by a gesture is not limited to motion of the object. For example, it is possible to give a command to a camera.

An image of the gesture by the user U is taken by the cameras 111L and 111R of the command input system 100 and the image signals formed by the cameras are processed by the video effector 1121. Then, the processed image signal is converted into digital data by the A/D converter 1122. The video effector 1121 processes the image signal so that the image of the penlight PL is emphasized. The image data converted into the digital data is supplied to the information processing unit 150. The process executed by the information processing unit 150 is now described.

Figure 16:
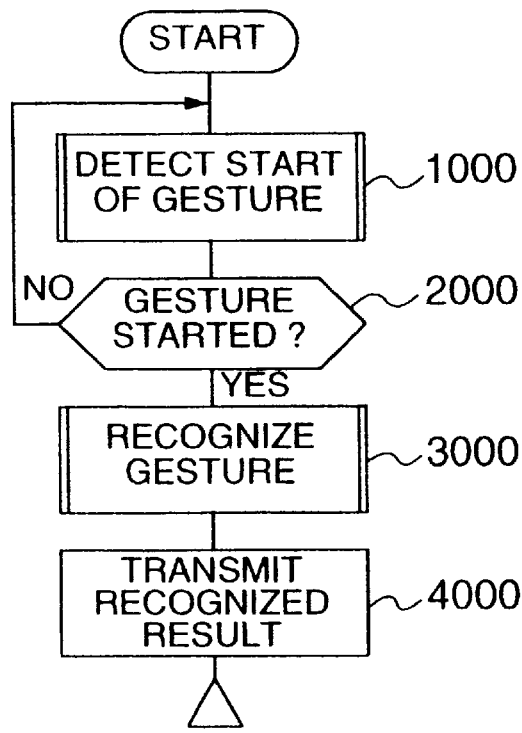
FIG. 16 is a flow chart showing a command input process executed by an information processing unit for a command input process according to an embodiment of the present invention.

FIG. 16 shows the command input process executed by the information processing unit 150. As shown in FIG. 16, in the command input process, detection of start of a gesture, that is, start of input of a command (step 1000) is made until the start of a gesture is detected (step 2000). When a gesture is started, the gesture, that is, contents of a command are recognized (step 3000). The recognized contents of the command are sent to the virtual world expressing system 200. The images from the cameras 111L and 111R are taken in by executing the whole control procedure stored in the whole control procedure memory portion stored in the memory 152 shown in FIG. 12 by the CPU 151. The gesture start detection process and the gesture recognition process are realized by executing the command start detection procedure and the command content recognition procedure stored in the memory 152 by the CPU 151.

Figure 17:
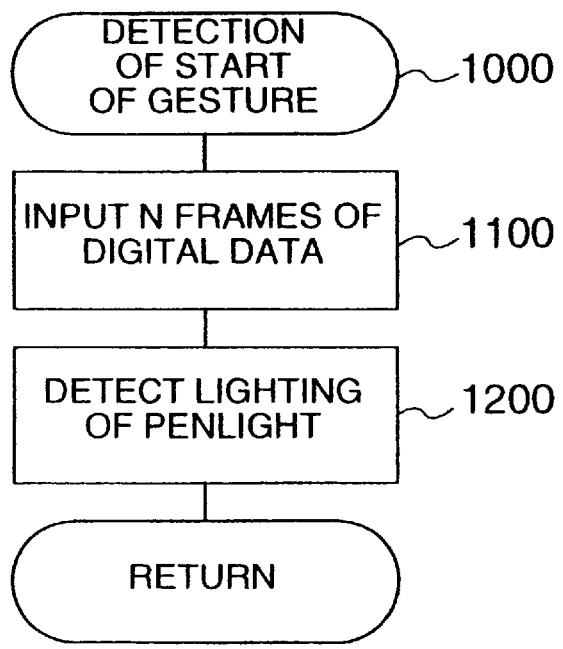
FIG. 17 is a flow chart showing a command start (start of gesture) detection process which is a partial procedure of the command input process of FIG. 16.

The gesture start detection process (1000) is performed as shown in FIG. 17. The image data formed by the cameras 111L and 111R are taken in as digital data for N frames through the image processing unit 112 to be stored in the moving-image-taken-by-camera-1 memory area 1532 and the moving-image-taken-by-camera-2 memory area 1533 of the memory 153 (step 1100). Whether the penlight PL is lit or not is detected from the stored digital image data (step 1200). More particularly, the pixel pattern obtained by forming an image of the penlight PL is previously defined and the presence of this pixel pattern is detected, so that lighting of the penlight PL is detected.

Figure 18:
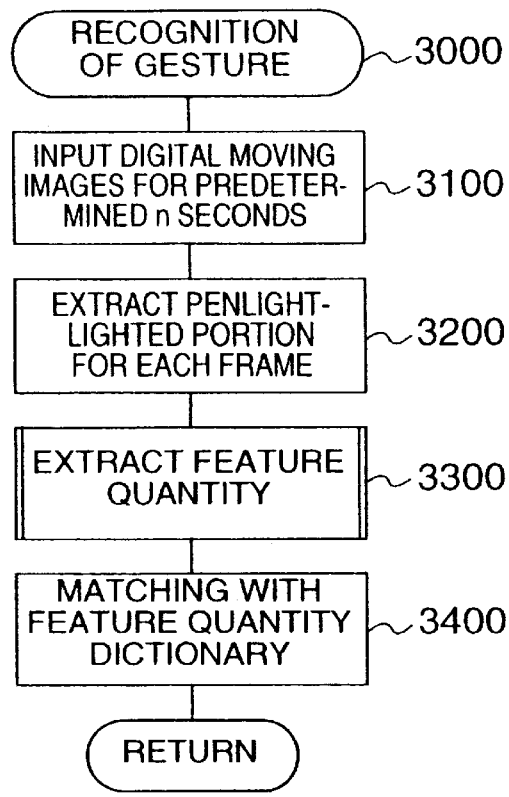
FIG. 18 is a flow chart showing a command (gesture) recognizing process of FIG. 16.

The gesture recognition process (3000) is now performed as shown in FIG. 18. Frames of the moving images for predetermined n seconds are stored in the moving-image-taken-by-camera-1 memory area 1532 and the moving-image-taken-by-camera-2 memory area 1533 of the memory 153 (step 3100). The pixel pattern corresponding to the lighting portion of the penlight PL is extracted for each of the stored frames and a position thereof is stored in the working area 1531 (step 3200). This is performed for all of the stored frames. A feature quantity is extracted from data indicating a distribution of the pixel patterns stored in the working area 1531 (step 3300). The extracted feature quantity is compared with the feature quantity stored in the feature quantity dictionary 154 to judge contents of a command (step 3400).

Figure 19:
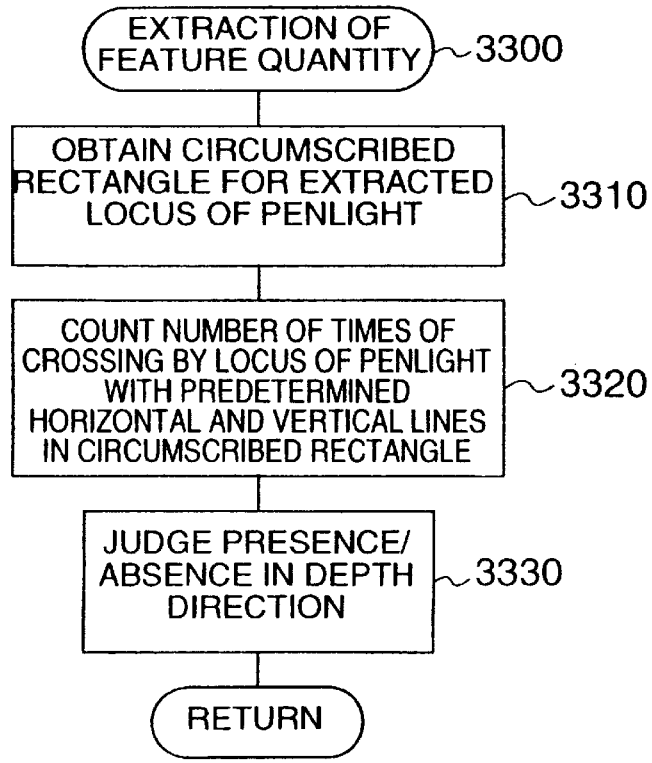
FIG. 19 is a flow chart showing a feature quantity extracting process of FIG. 18.
Figure 20:
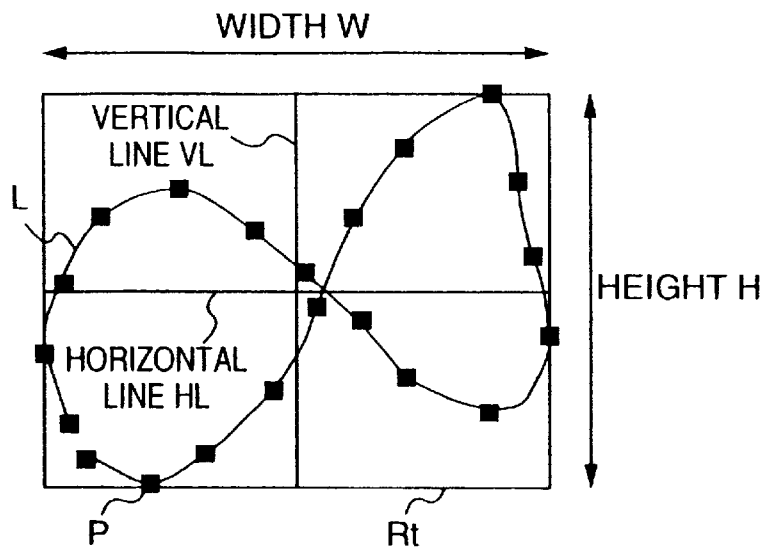
FIG. 20 shows a circumscribed rectangle for extracting a feature quantity from a locus of light points of a penlight.

The feature quantity extraction process (3300) obtains a circumscribed rectangle Rt for an extracted locus L of the lighting points P of the penlight PL as shown in FIG. 19 (step 3310). More particularly, as shown in FIG. 20, a length of a side in the vertical direction (height h) is determined by a maximum value and a minimum value in the vertical direction of the locus L of the lighting points P of the penlight PL and a length of a side in the horizontal direction (width w) is determined by a maximum value and a minimum value in the horizontal direction of the locus L to thereby obtain the circumscribed rectangle Rt. The number of times of crossing by the locus of the penlight with a predetermined horizontal line HL and a predetermined vertical line in the circumscribed rectangle Rt is counted (step 3320). The predetermined horizontal line HL can assume a horizontal line HL at the middle in the height direction of the circumscribed rectangle Rt, for example. Similarly, the predetermined vertical line VL can assume a vertical line VL at the middle in the width direction in the circumscribed rectangle Rt.

Figure 22:
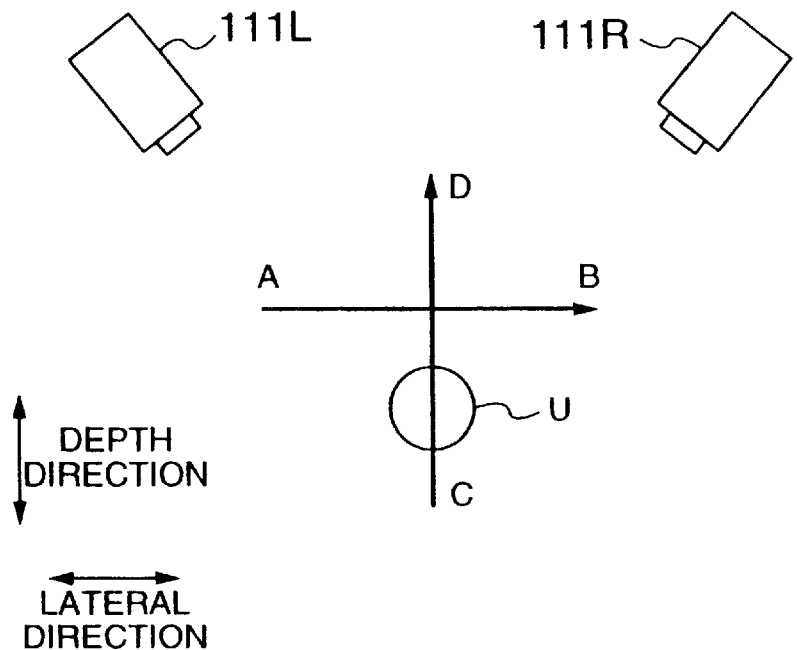
FIG. 22 shows two cameras as viewed from above for taking an image of a gesture made by a user.
Figure 23:
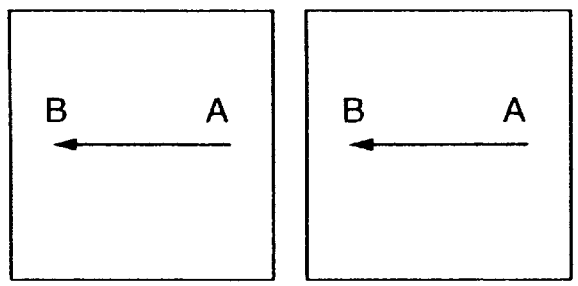
FIG. 23 shows loci in phase of a gesture swung in the horizontal direction with respect to two cameras.
Figure 24:
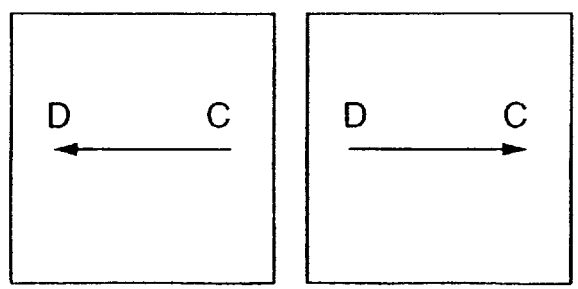
FIG. 24 shows loci in opposite phase of a gesture swung in the depth direction with respect to two cameras.

The presence/absence in the depth direction is now judged (step 3330). The depth direction is, as shown in FIG. 21, a direction when the user U swings the penlight P toward the two cameras 111L and 111R. In FIG. 21, the depth direction is a direction shown by CD. FIG. 22 shows the configuration of FIG. 21 as viewed from the upper portion. The determination is made by examining whether the moving directions of the loci L of the lighting portions of the penlight PL obtained by the cameras 111L and 111R have the same phase or opposite phase. In an example shown in FIG. 23, the loci obtained by the cameras 111L and 111R have the same direction (same phase) and accordingly it is understood that the loci are in the horizontal direction. In another example shown in FIG. 24, since the loci obtained by the cameras 111L and 111R have the opposite direction (opposite phase), it is understood that the loci are in the depth direction.

Determination of the feature quantity thus obtained is made with reference to the feature quantity dictionary shown in FIG. 25. When the conditions prescribed in the dictionary are satisfied, it is determined that the gesture made by the user U is a gesture prescribed in the feature quantity dictionary. Further, although not shown in the dictionary of FIG. 25, a command is defined for each gesture, for example, as shown in FIG. 15.

The virtual world expressing system 200 is now described in more detail together with operation thereof. An example where a dolphin is expressed as an object is now described.

Figure 26:
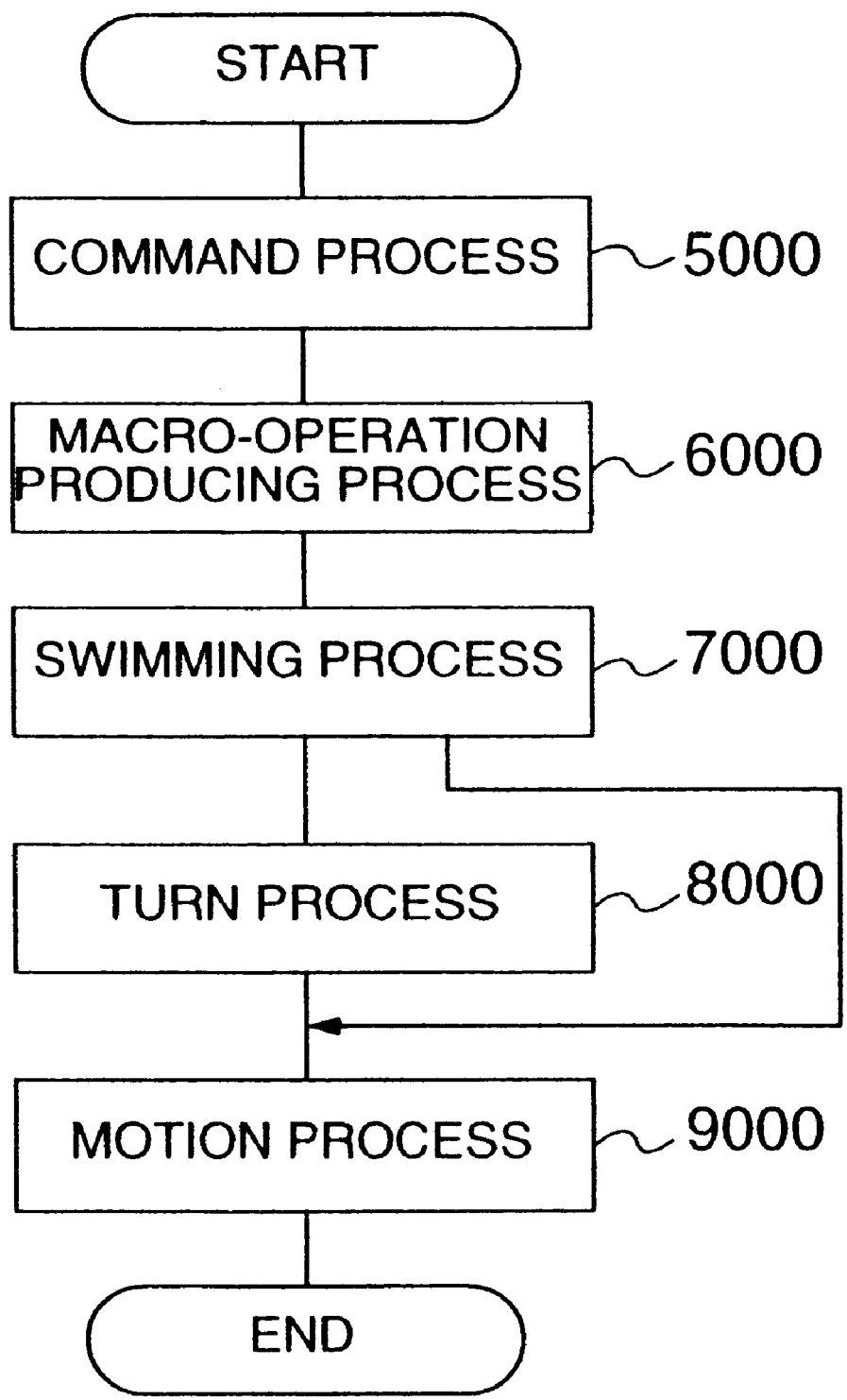
FIG. 26 is a flow chart showing a process of a virtual world expressing system using an embodiment of the present invention.

FIG. 26 shows a process performed by the virtual world expressing system 200. In this system, there are provided a command process (step 5000) for performing a process for contents of a command input by the command input system 100, a macro-operation producing process (step 6000) for operating an object on the basis of a command or the like, a process (step 7000) for a swimming state of an object, a turn process (step 8000), and a motion process (step 9000) of an object. The virtual world expressing system 200 further includes means for producing an image for an object, environment and accompanying effect although not shown.

Figure 27:
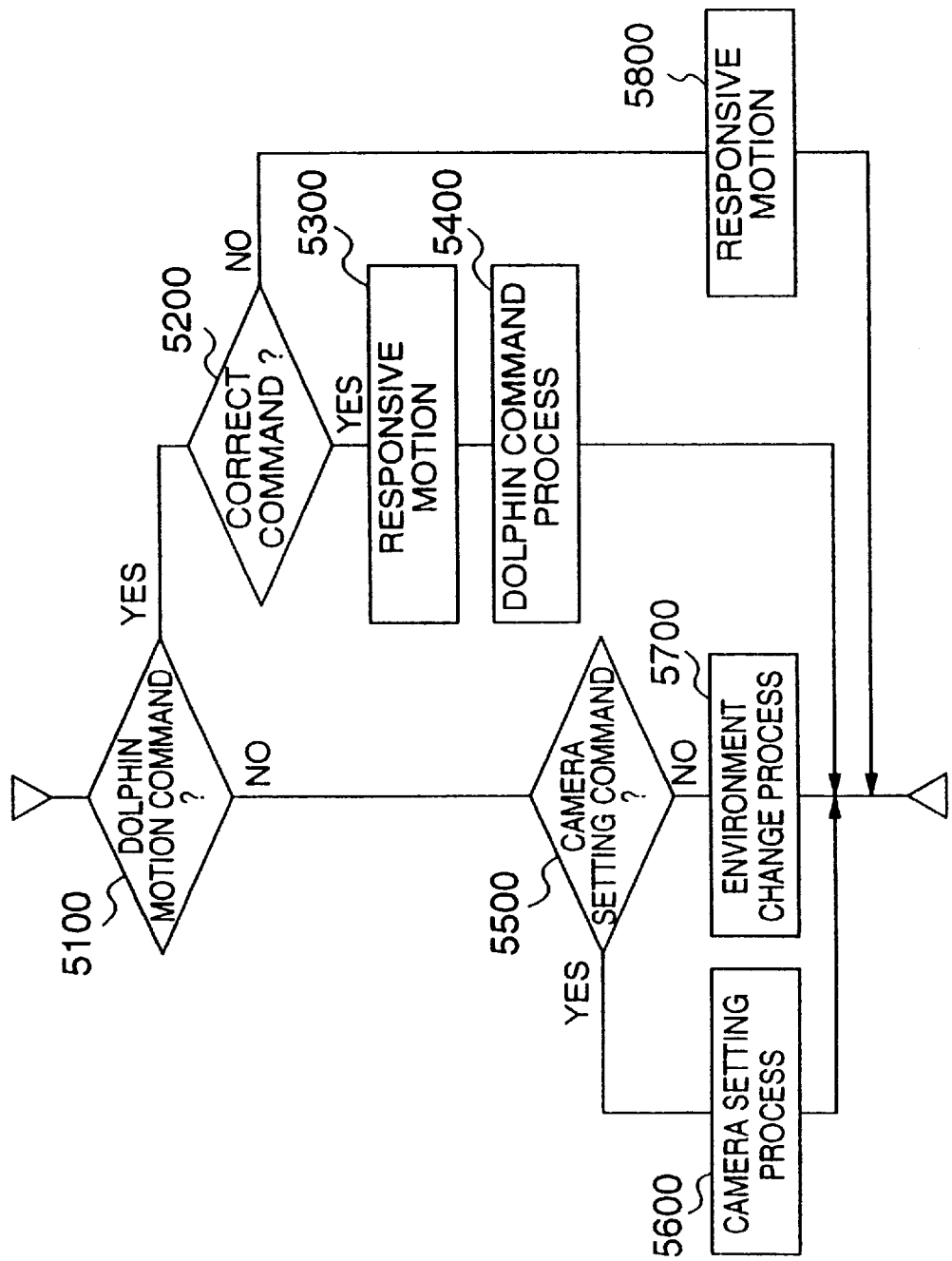
FIG. 27 is a flow chart showing a detailed procedure of a command process of FIG. 26.

The command process (5000) is branched for each of the commands of a plurality of kinds to perform each process. An example of FIG. 27 shows branches relative to three commands including a command relative to the motion of a dolphin, a command relative to change of a camera and a command relative to change of environment. In this example, when a dark command is inputted in the command input system 100, the dark command is assumed to be a command relative to motion of a dolphin tentatively.

As shown in FIG. 27, it is determined whether a command sent from the instruction input system 100 is a dolphin motion command or not (step 5100). When the command is the dolphin motion command, it is determined whether the command is a correct command or not (step 5200). When the command is the correct command, a dolphin constituting an object is caused to make a responsive motion representing the command (step 5300). As the responsive motion of this kind, for example, as shown in FIG. 28a, the dolphin constituting an object is caused to make at least one of an answer by sound and a specific motion such as shaking of the dolphin's neck, so that a response to the input command can be clarified. In the example of FIG. 28a, the dolphin shakes its neck vertically. The dolphin command is processed as described later (step 5400). On the other hand, when the command is not the correct command, the dolphin constituting the object is caused to make the responsive motion representing the command (step 5800). As the responsive motion of this kind, for example, as shown in FIG. 28b, the dolphin constituting the object is caused to make at least one of an answer by sound and a specific motion such as shaking of the dolphin's neck, so that a response to the input command can be clarified. In the example of FIG. 28b, the dolphin shakes the neck horizontally.

Next, it is determined whether the command is a camera setting command or not (step 5500). When the command is the camera command, the process proceeds to a camera setting process 5600 (step 5600).

On the other hand, when the command is neither the dolphin command nor the camera setting command, it is assumed that a command for an environment change process is input, and the environment change process is executed (step 5700). As the environment change process, for example, change of a background image, change of color, and the like are performed with reference to the CG database 230 (refer to FIG. 2).

The process for the dolphin command is now described. The dolphin command is a command for changing a state of an object. More particularly, as shown in FIG. 29, an internal state of an object is set (step 5410). The internal state of the object is defined for each object, for example, as shown in FIG. 30. Definition items include, for example, the vigor of an object, a target point of motion, a command, a collision possibility and the like. As shown in FIG. 31, each object has data indicating a current motion state. The motion state shown in FIG. 31 is described by a center position (X, Y, Z) of an object, angles ($\alpha$, $\beta$, $\gamma$: direction) with respect to axes X, Y and Z, and velocities (Vx, Vy, Vz).

Figure 32:
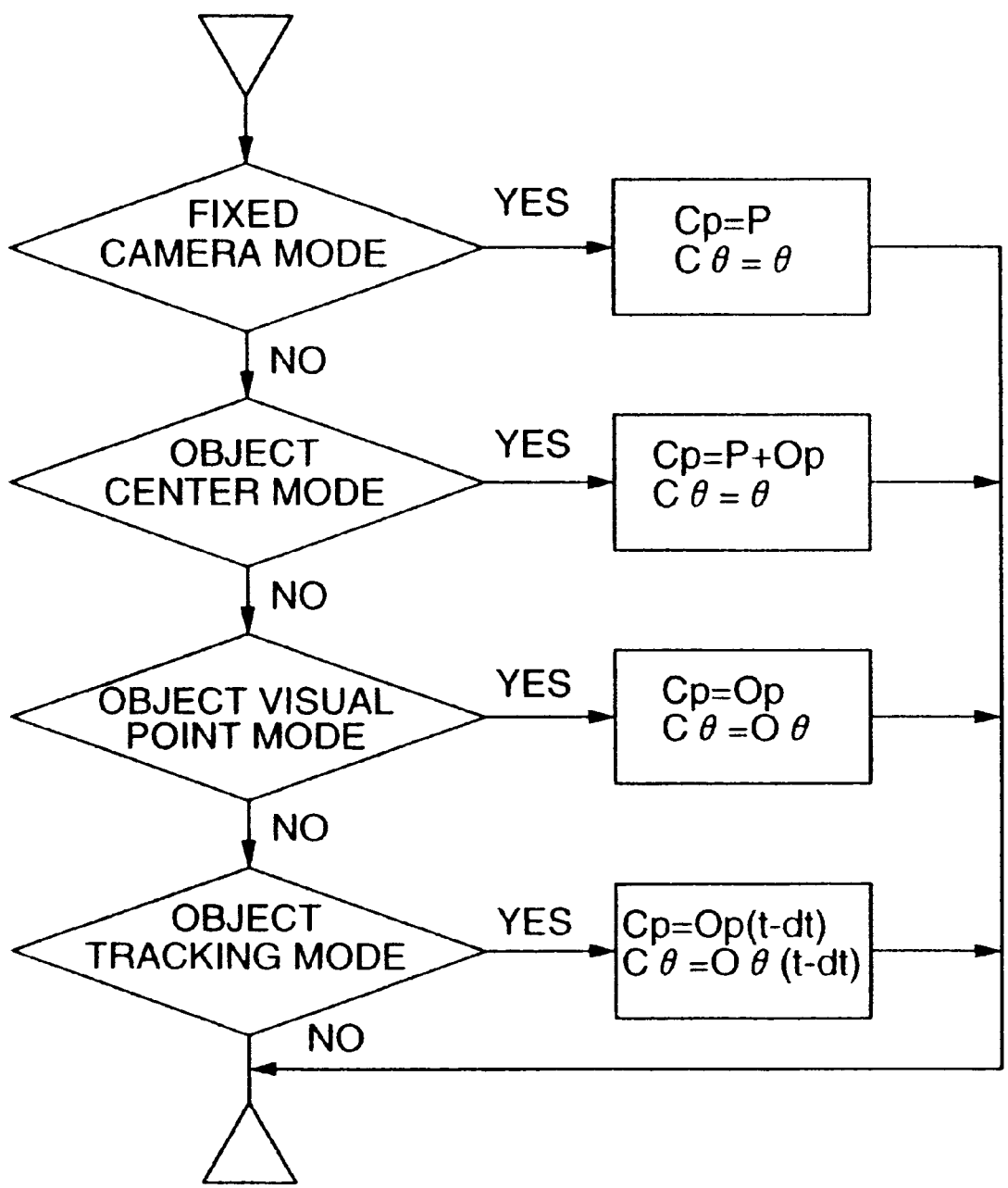
FIG. 32 is a flow chart showing an example of a setting process of a camera.

The camera setting process is now described. A camera is set by a camera position Cp and a camera direction C$\theta$. As shown in FIG. 32, in the present invention, for example, a fixed camera mode, an object center mode, an object visual point mode and an object tracking mode can be set. In FIG. 32, the camera position Cp and the camera direction C$\theta$ are set in each mode. In FIG. 32, P is a predetermined position, $\theta$ a predetermined direction, Op a center position of an object, and O$\theta$ a direction of an object.

Figure 33:
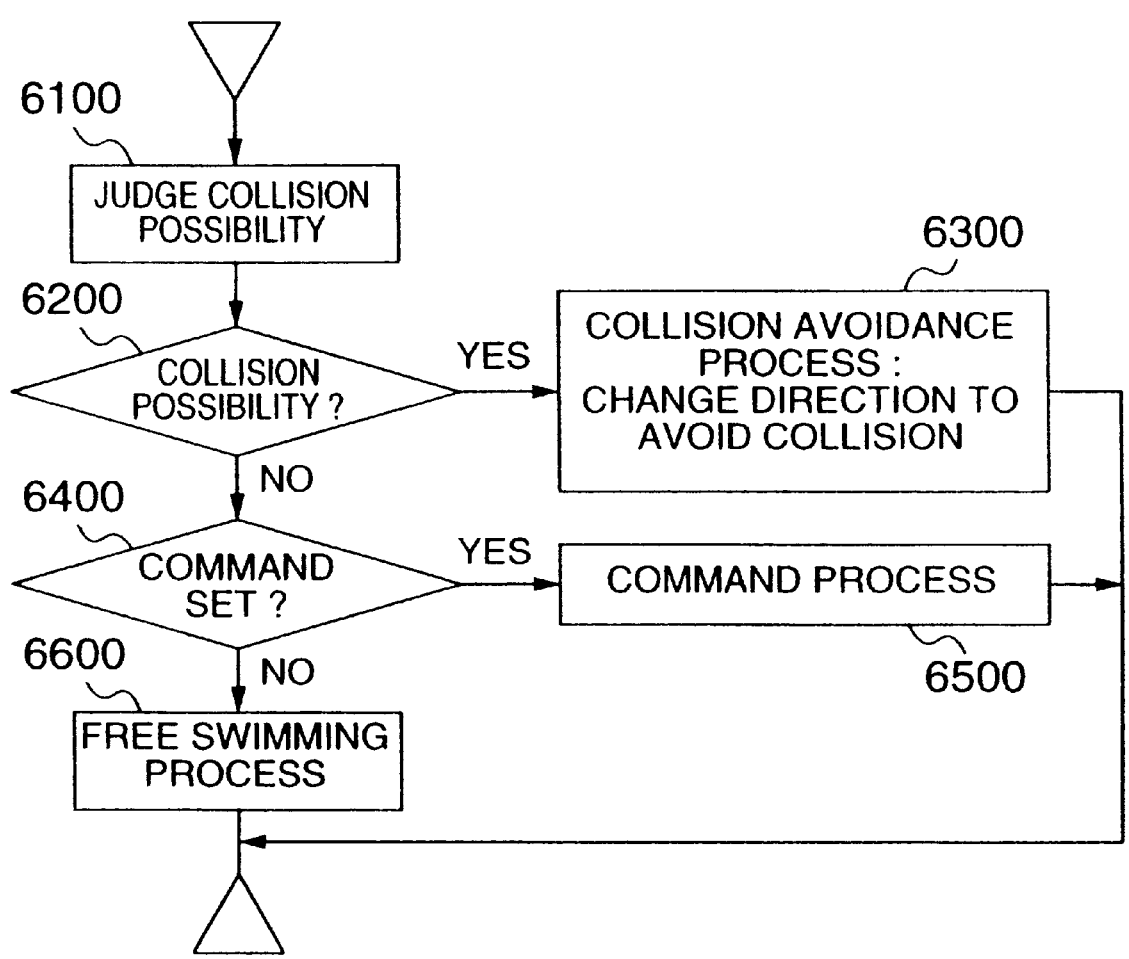
FIG. 33 is a flow chart showing an example of a macro movement producing process.

The macro-operation process of FIG. 26 is now described with reference to FIG. 33. In FIG. 33, the system first determines the possibility of collision. More particularly, determination as to whether an object collides with other obstacle or another object or not is made (step 6100). The collision possibility is determined using a mutual distance and a relative velocity. When there is the possibility of a collision, a movement direction is changed in order to avoid collision (step 6300). When there is no collision possibility, it is examined whether a command for an object is set as an internal state or not (step 6400). When the command is set, a command process is performed (step 6500). As the command process, a tracking process, a twisting and rotating process and jump can be prepared. When a command is not set, the object can be moved freely by means of default (step 6600).

Figure 34:
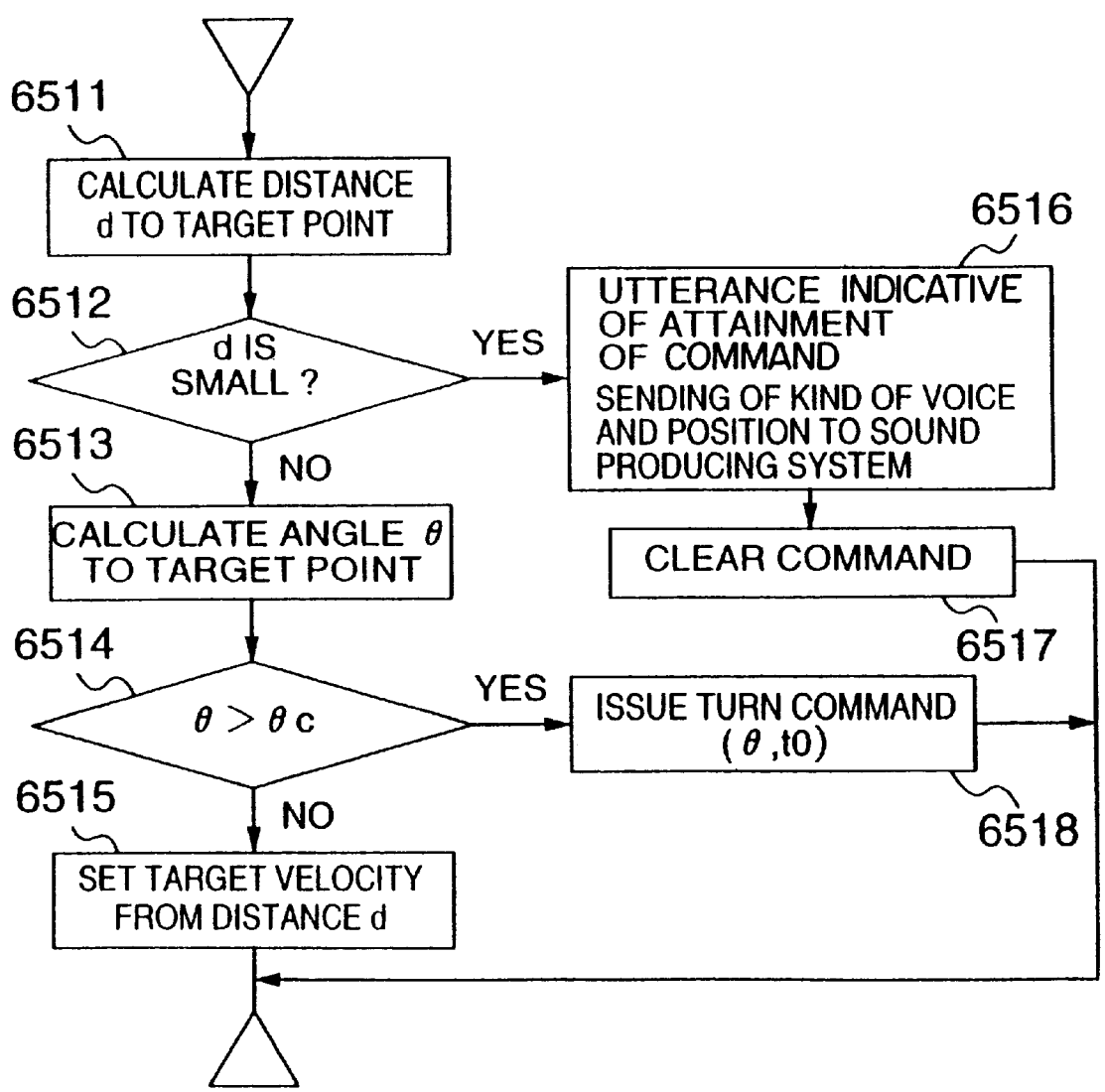
FIG. 34 is a flow chart showing an example of a tracking process of an object.

The tracking process is performed as shown in FIG. 34. A distance d to the target point is calculated (step 6511). When the distance d is smaller than a predetermined value, it is determined that the command is achieved, and the object is caused to produce a response. More particularly, information of voice and position of the object is sent to the sound producing system (step 6516). Thereafter, the command set as the internal state is cleared (step 6517). On the other hand, when d is large, an angle $\theta$ to the target point is calculated (step 6513). When the angle $\theta$ is $\theta > \theta c$, the turn command is issued (step 6518). Further, when the angle is not $\theta > \theta c$, a target velocity is set from the distance d (step 6515). The velocity is set by a distance. Further, when the target point is approached, the velocity can be reduced.

Figure 35:
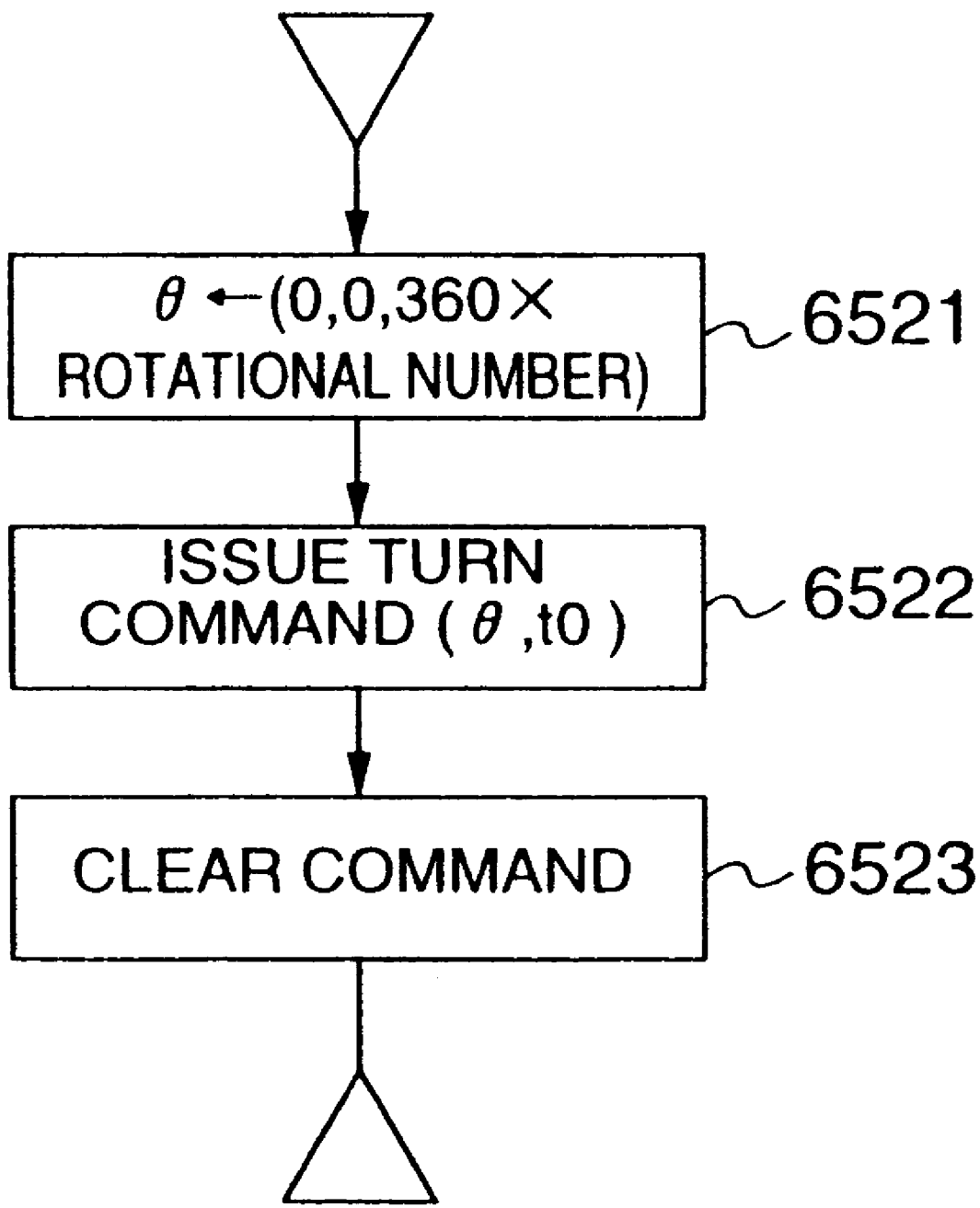
FIG. 35 is a flow chart showing an example of a twisting and rotating process of an object.

The twisting and rotating process is realized by rotating plural times while utilizing the movement direction as an axis. More particularly, as shown in FIG. 35, an angle corresponding to the number of rotation about any axis is set (step 6521). In order to perform the rotation, the turn command is issued (step 6522). The command of turn (θ, to) represents rotation by θ for to seconds. After the turn command is performed, the command is cleared (step 6523).

The jump process is now described with reference to FIG. 36. In order to perform the jump, it is necessary to examine whether the jump can be performed in the current motion state or not. When jumping is impossible, the internal state is set to return to a deep position under the water once. Further, when jumping is possible, an angle when an object jumps out from the water is set to a predetermined angle, for example, 45 degrees.

Figure 36:
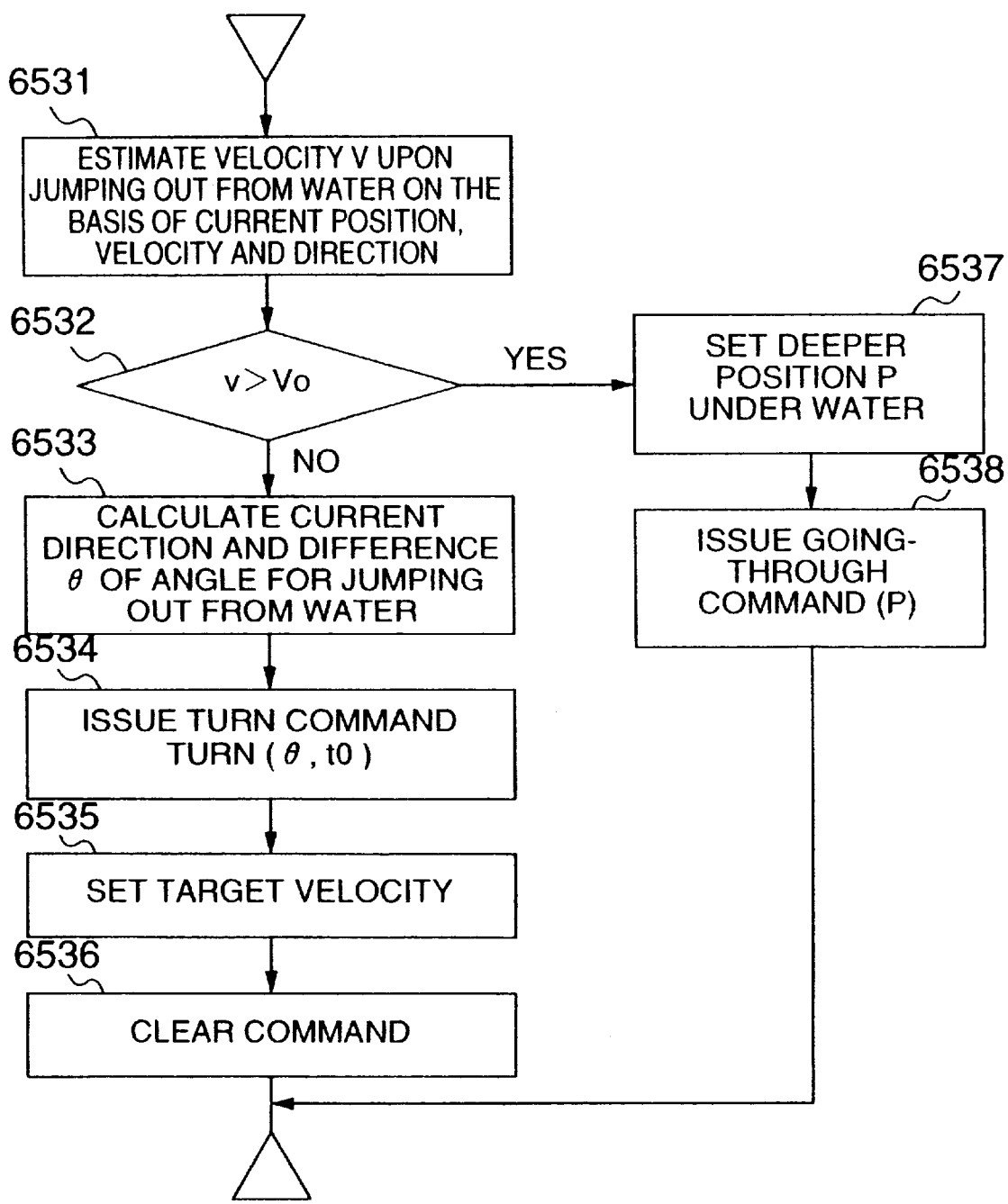
FIG. 36 is a flow chart showing an example of a jumping process of an object.

In FIG. 36, a velocity V of an object when the object jumps out from the water is estimated from a current position, velocity and direction of the object (step 6531). It is examined whether a velocity V0 obtained by accelerating the object at the current position is lower than a target velocity V or not (step 6532). When the velocity V0 is lower than the target velocity V, the velocity is insufficient to jump as it is and accordingly a deeper position P under the water is set (step 6537). A command for going through the position P is issued (step 6538). On the other hand, when the velocity V0 is not lower than the velocity V, jumping is possible and accordingly the current direction and a difference θ of the angle for jumping out from the water are calculated (step 6533). The turn command for turning by θ is issued (step 6534). Thereafter, a target velocity for increasing a velocity is set (step 6535). The jump command is cleared (step 6536).

The swimming process 7000 is now described with reference to FIG. 37 which shows a process for a swimming motion of a dolphin constituting an object.

In this example, the dolphin is given a target swimming velocity. The dolphin adjusts the swimming velocity by dolphin kick swimming so that the velocity is always equal to the target velocity. The strength and the period of the kick are determined for each first timing of each kick. It is assumed that the velocity V0 is reached by a normal kick (strength 1 and period T) and a correction coefficient c is calculated for the target velocity V. At this time, the period is T/c and the strength is C. One swimming motion is obtained with reference to basic data for motion. The obtained swimming motion is corrected in accordance with the strength and the period. θ is an angle of joint.

Figure 37:
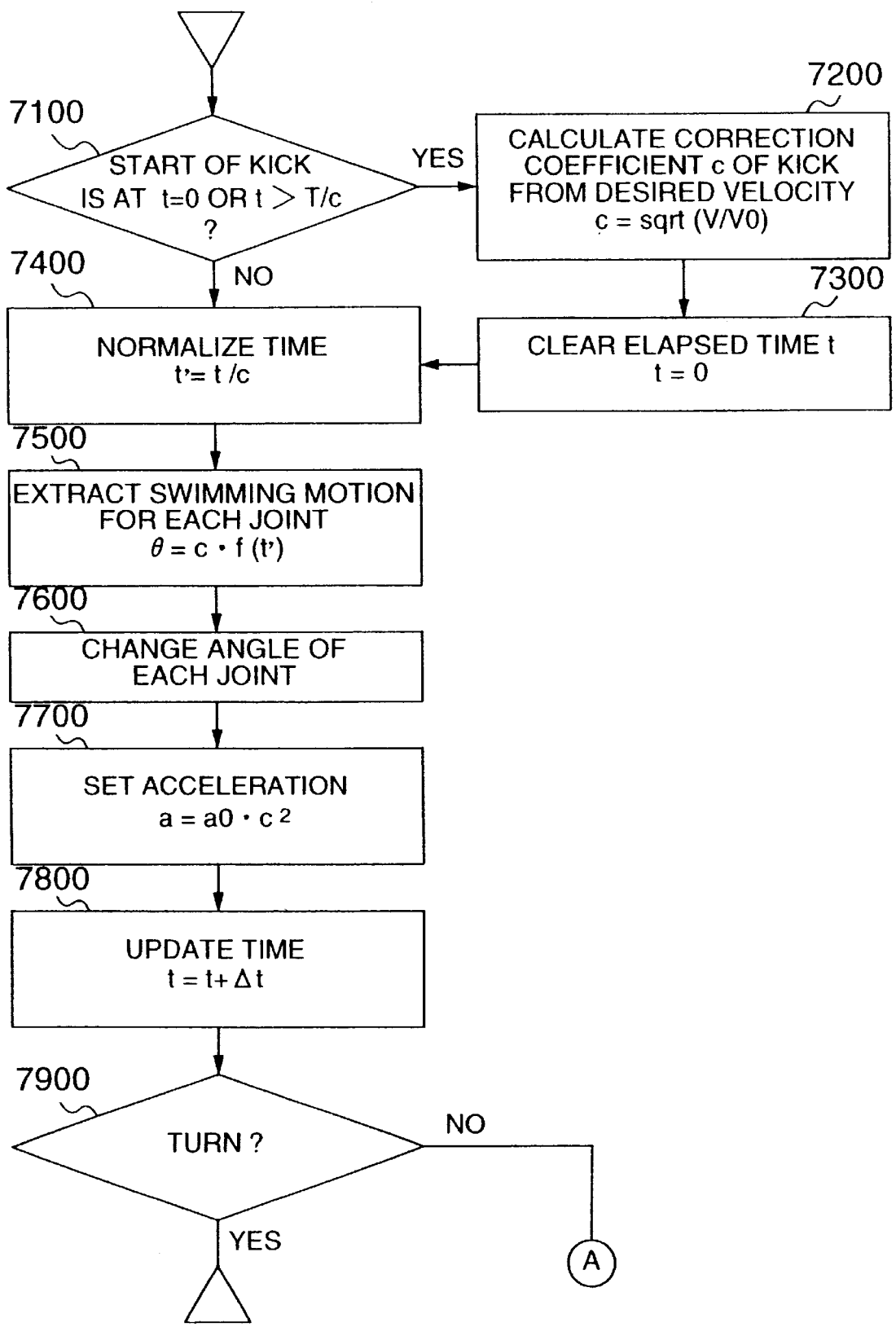
FIG. 37 is a flow chart showing an example of a swimming process of an object.

In FIG. 37, the system determines whether start of kick is t=0 or t>T/c or not (step 7100), and when the start is t=0 or t>T/c, the correction coefficient c of kick is calculated from a desired velocity (step 7200). An elapsed time is cleared (step 7300). Then, in step 7400, time is normalized. That is, t'=t/c. A swimming motion for each joint is extracted (step 7500). The swimming motion is given by an angle for each portion of the skeleton in respect to time as shown in FIG. 9a. The swimming motion is corrected by changing the angle of the joint (step 7600). Thus, the swimming state is changed. An acceleration is set at this state (step 7700). The acceleration is obtained by multiplying an initial acceleration aO by a squared correction coefficient c. Time is then updated (step 7800). It is examined whether a turn is present or not (step 7900). When a turn is present, the process proceeds to a next turn process 8000 and when a turn is not present, the process proceeds to a motion process 9000.

The turn process is now described with reference to FIG. 38. The dolphin constituting the object is given an angle for a desired turnabout and time required therefor. The dolphins body is bent for turnabout. A function for bending the body is determined with reference to basic data for motion.

Figure 38:
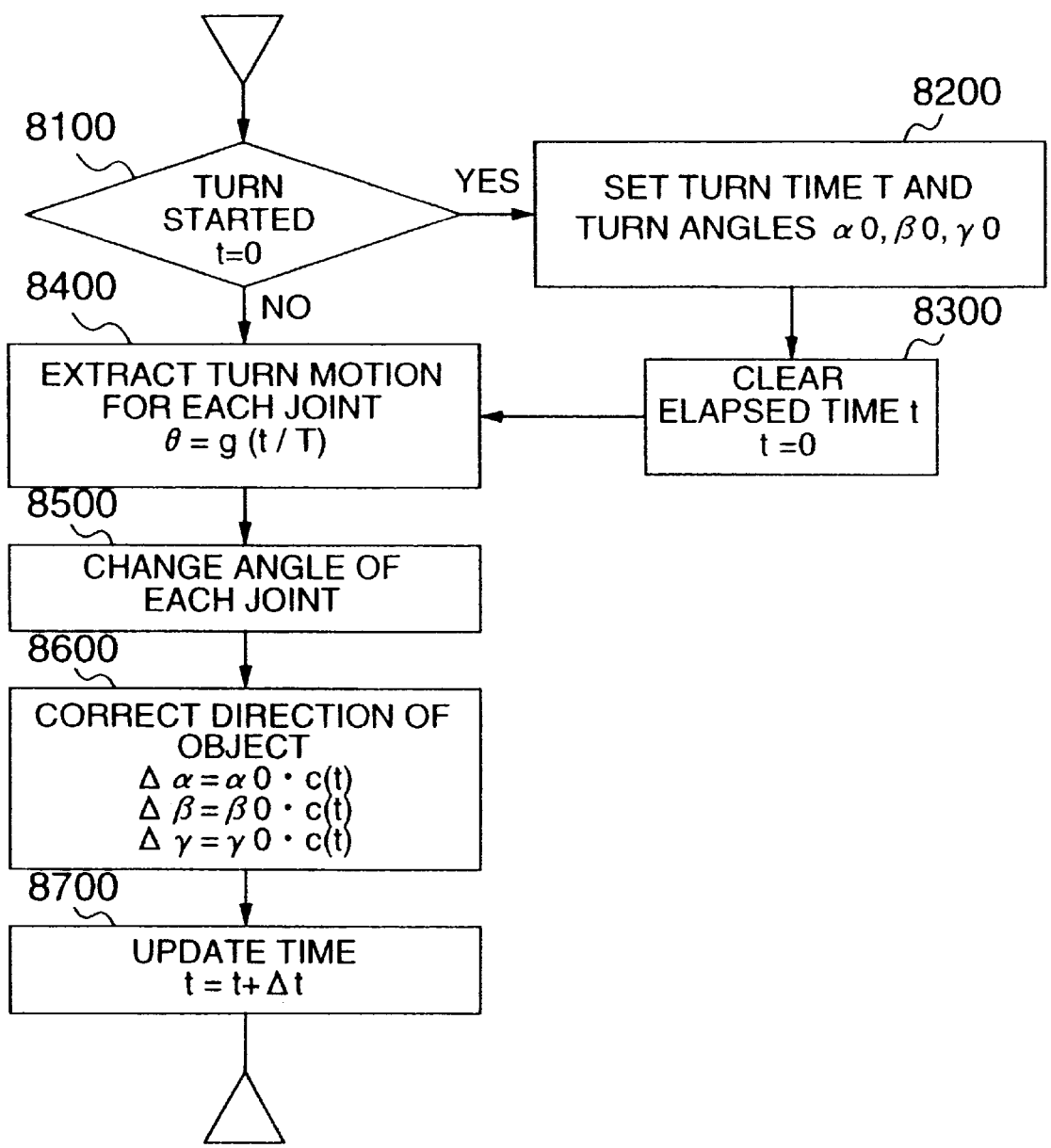
FIG. 38 is a flow chart showing an example of a turning process of an object.

In FIG. 38, first of all, it is examined whether a turn is started (t=O) or not (step 8100). When a turn is started, a turn time T and turn angles αO, β0, γ0 are set (step 8200). Thereafter, the elapsed time t is cleared (step 8300). Next, the turn motion is extracted (step 8400). The turn motion is a function of time for an angle of each portion of the skeleton as shown in FIG. 9b. In the same manner as the case of swimming, an angle of the joint is changed (step 8400) to correct a direction of the object (step 8600). Time is updated (step 8700).

Figure 39A:
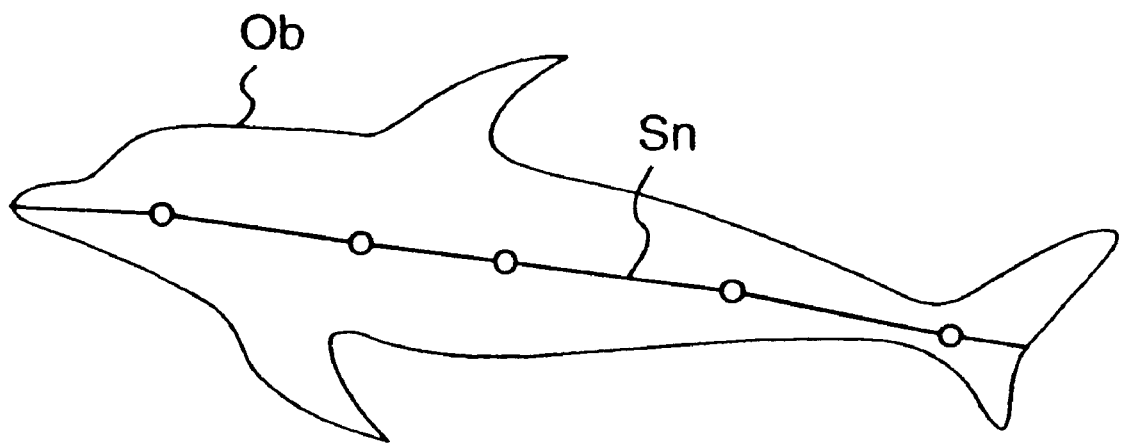
FIGS. 39a and 39b show figures of an object before change and after change due to an angular variation of a skeleton, respectively.
Figure 39B:
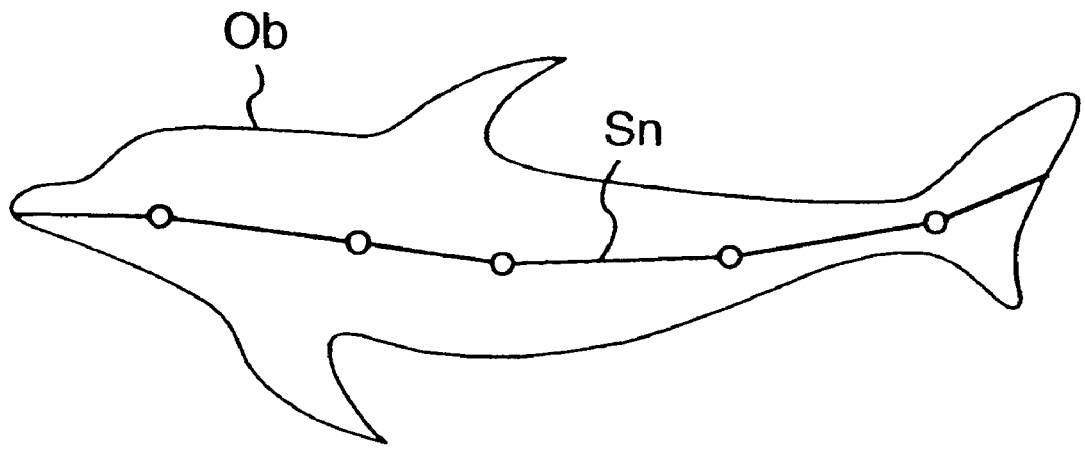

FIGS. 39a and 39b show figures of an object changed by correction of an angle of a skeleton of the object. FIG. 39a shows a figure which is not changed yet and FIG. 39b shows a changed figure.

The motion process is now described with reference to FIG. 40. In the motion process, the motion of a dolphin is described in accordance with the physical law in the environment. More particularly, a position of the dolphin is changed in accordance with an equation of motion. Further, information for processing sound and accompanying effects described later is produced together with the change.

Figure 40:
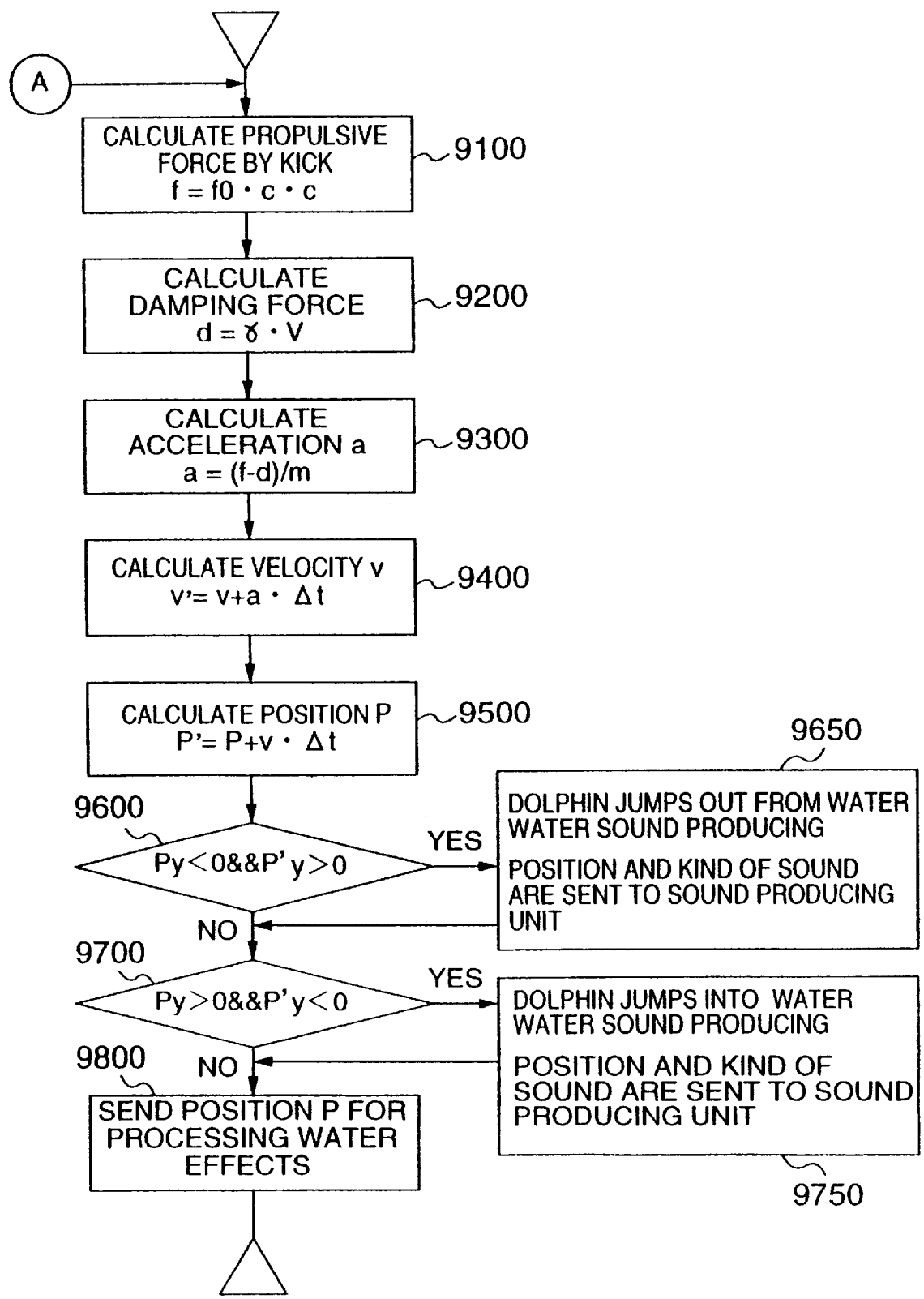
FIG. 40 is a flow chart showing an example of a movement process of an object.

In FIG. 40, first of all, when propulsive force at the normal state is f0, propulsive force f produced by kicking for changing the velocity is calculated using a correction coefficient c (step 9100). Further, damping force d for movement of the object is calculated by d=γ·v where γ is a damping coefficient (step 9200). An acceleration a is then calculated (step 9300). When the mass of the object is m, the acceleration a can be calculated from a difference of the propulsive force f and the damping force d. A velocity v' is calculated from the acceleration a, a time step Δt and the current velocity v (step 9400). The position after one time step is calculated from the current position P and the velocity v (step 9500).

Next, it is determined whether the object jumps out from the water or into the water in accordance with the fact that a component y of the obtained position P is above or below the surface of water (y=O) (step 9600, 9700). When Py<0 and P'y>O, the object jumps out from the water (step 9650). When Py>0 and P'y<O, the object jumps into the water (step 9750). Information regarding the jumping is sent to the sound producing means 250. Further, the obtained position P is sent to the accompanying effect producing means 220 (step 9800).

The information of the position, the form and the like of the object obtained by the above process is stored in the working area 2631 of the memory 263 shown in FIG. 13. In the CG producing unit, the CPU 261 produces an image in accordance with the image producing procedure stored in the memory 262. At this time, data stored in the working area 2631 is used.

The accompanying effect producing means is now described in more detail. The following description is made for when the influence that the motion of an object has on the water where the object exists is added incidentally as the accompanying effect by way of example. In this example, spray, bubbles, water rings, and wakes are handled. These are shown in FIGS. 5a, b and c and FIG. 6. How to produce them is now described.

Figure 41:
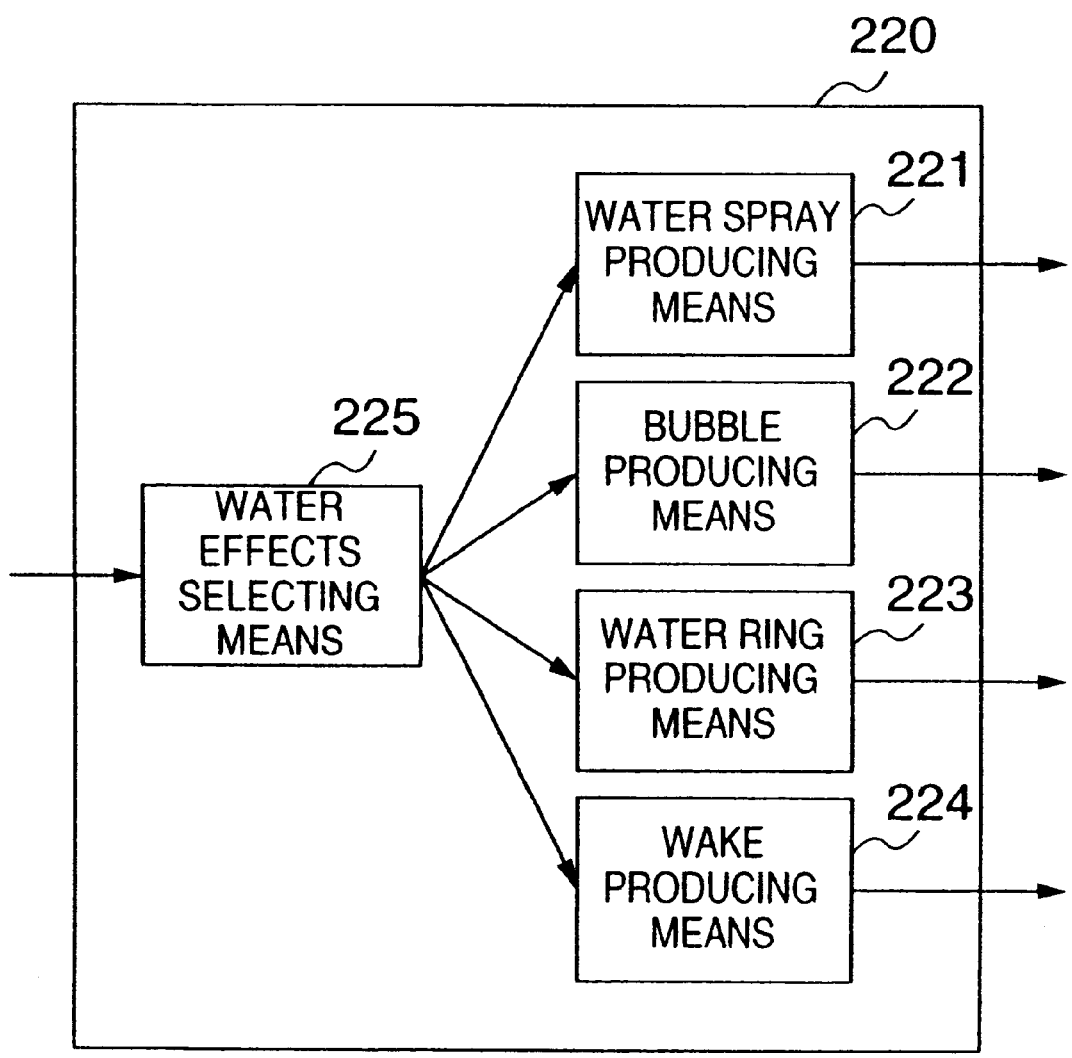
FIG. 41 is a block diagram illustrating an example of a functional configuration of an accompanying effect producing means.

The accompanying effect producing means 220 includes, for example, as shown in FIG. 41 schematically illustrating the function thereof, water spray producing means 221, bubble producing means 222, water ring producing means 223, wake producing means 224, and water effects selecting means 225 for determining which of them is used.

Figure 42:
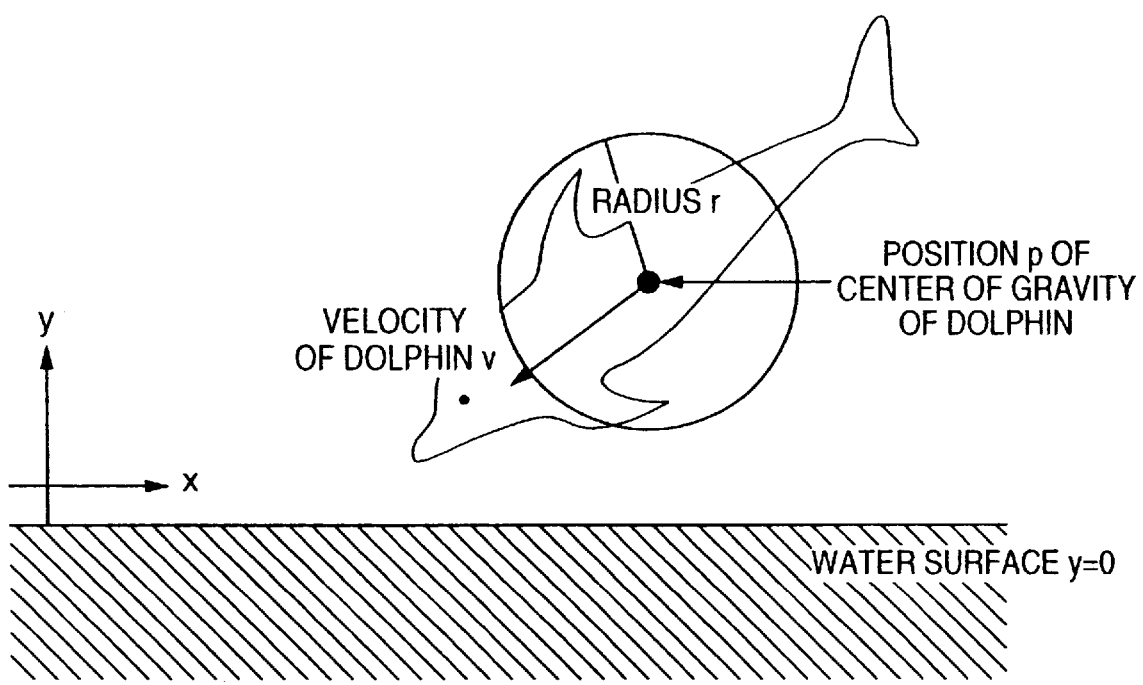
FIG. 42 illustrates production of accompanying effect by a ball model of an object.

In order to describe the producing mechanism, as shown in FIG. 42, an object is modelled by a ball. In other words, a center P of an object is a center of the ball and the object is expressed by the ball having a radius of r. Various effects of water produced when the ball moves in the water, jumps out from the water and jumps into the water again are utilized as the accompanying effects by the object.

Referring now to FIGS. 6, 43, 45 and 46' the accompanying effects produced in response to states of the object are described in order. In the water at stage S1, bubbles are produced with movement of the object. FIG. 43 shows this state. That is, as the object Ob moves, bubbles are produced after the object and the bubbles float by buoyant force. When the bubbles reach the surface of the water, the bubbles disappear.

At stage S2, the object jumps and reaches the surface of the water. Spray (see FIG. 44) and water rings (see FIG. 45) on the surface of the water are produced. That is, spray is produced at the rear in the movement direction of the object Ob as if the spray is pulled by the object and falls due to gravity and disappears with the lapse of time. Further, when the object leaves the surface of the water, water rings are produced and spread with time. The water rings are expressed with color. The density of the color is thinned as the water rings are spread. When the water rings disappear, the color of the water rings becomes transparent.

At stage S3, the object exists above the surface of the water completely. At this time, there is a possibility that spray remains and water rings are spread. At this stage, the life of the spray and bubbles are set so that the spay and the bubbles disappear in a short time.

At stage S4, the object jumps into the water again. In this case, water rings, spray and bubbles are produced. At stage S5, the object cruises or swims along the surface of the water. In this case, wakes and bubbles are produced upon movement along the surface of the water. FIG. 46 shows wakes produced at the rear of the object Ob due to movement of the object. The wakes are produced at regular intervals. The wakes are painted by fixed color in order to show the wakes. Shape of the wakes is changed with the elapse of time. That is, space between the wakes is broadened and the color of the wakes is thinned. When the color becomes transparent, the wakes disappear.

An application example of the present invention is now described. The present invention is disposed in a hall or the like and can be used to realize an image program for audience participation. A command can be given to an object in animation, for example. Further, the present invention can be applied to a system in which an image of an orchestra is displayed and sound is produced, so that an audience participant swings a baton to thereby change a performance state of the orchestra in response to the swinging of the baton.

The present invention can be applied to a small-scaled apparatus, for example, such as a small scaled domestic theater system, an electronic game machine and an apparatus mounted in a vehicle as well as large-scaled 5 facilities such as a theater.

The present invention can be applied to an apparatus in which a moving body (object) is displayed in a screen and the moving body moves in space of the virtual world on the basis of a command of an operator. In this case, a moving locus can be commanded to the moving body to thereby move the moving body along the moving locus in the virtual world.

In the embodiment of the present invention, when a command is given to an object, it can be notified by means of at least one of display on a picture and sound that the object can understand the command or cannot understand the command. Further, a display for demanding to issue the command again is also made.

When an object is a virtual living body having a function defined as if the object determines and acts autonomously in the virtual world, a response to a command can be expressed by change of a form thereof as well as sound. The virtual living body includes the aforementioned dolphin. The change of the form is a motion selected from feeling expressive forms defined in the virtual living body and includes, for example, shaking of its neck, escape, approach, change of expression and the like. Further, the sound includes crying, a voice and the like.

Furthermore, when the object waits for a command, it can be expressed by causing the object to approach the user on a picture. In this case, sound may be also produced. While waiting for the command, the object can stand still, move at random or perform a predetermined movement.

Further, when a command is given by a gesture, a direction of an object can be changed in order to indicate whether the object receives the command or not. In addition, when there are a plurality of objects, a direction of a part or all of the objects can be changed to thereby express whether the objects receive the command or not. In this case, when the objects are artificial living bodies, the change of the direction can be attained by turning faces or eyes thereof to the front.

When an object is commanded to move, rotate or the like, the motion can be determined in accordance with the physical law defined in the virtual world. For example, a physical law in the real world may be applied to the physical law defined in the virtual world as it is. For example, the law of conservation of momentum, the law of increased entropy, and an equation of motion for describing motion can be used. Further, the object can move while a buoyant force is given to the object in the water and is not given to the object outside the water so that moving states of the object in the water and outside the water can be changed to express the object.

In addition, peculiar movement forms can be given to an object. In this case, when a command for movement is given to the object, the object moves to a desired position by a peculiar movement form without reception of a command as to how to move. The peculiar movement form includes, for example, swimming, flying, walking and the like.

Furthermore, a command for an object is given by a locus in a range capable of being surrounded by a circumscribed rectangle. By surrounding by the circumscribed rectangle, a gestured content can be specified by a ratio of a width and a height of the circumscribed rectangle and the number of crossing of a predetermined horizontal line or vertical line and a locus. This can reduce a burden for processing as compared with the pattern matching.

As described above, in the embodiment of the present invention, a command for changing a state of an object can be inputted regardless of a form of the object. Further, the command can be extracted easily and be given exactly.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An image producing/displaying system for producing and displaying an image, comprising:

a virtual world expressing system which constructs a virtual world including at least one object and environment in which the object exists and produces an image for visually displaying at least part of the virtual world;

an output system for visualizing the image produced by said virtual world expressing system and outputting the image; and a command input system for inputting a command to said virtual world expressing system, wherein said command input system includes:
imaging means for forming an image of fixed space, and
command content recognizing means for detecting a movement state of a specific pixel pattern contained in the formed image to extract feature quantity from the movement state and comparing said feature quantity with a predetermined reference to recognize a relevant command so that the command is notified to said virtual world expressing system when the command can be recognized; and wherein said virtual world expressing system includes:
state setting means for setting states of the object and the environment included in said virtual world, and
image producing means for producing an image of said virtual world on the basis of information set in said state setting means;
said state setting means changing, when the notified command is related to any object, the setting of the state of the object on the basis of the command.

2. An image producing/displaying system according to claim 1, wherein said command input system further comprises command start determining means for determining start of the command;

said command start determining means detects the specific pixel pattern in the image formed in a time serial manner by said imaging means to determine that the command is started when the pixel pattern appears; and said command content recognizing means recognizes contents of the command after said command start determining means determines that the command has started.

3. A command input system for inputting a command to an information processing unit, comprising:

imaging means for forming an image of a predetermined spaced in a serial time manner;

means for detecting a movement state of a specific pixel pattern contained in the image formed in a serial time manner by said imaging means;

means for extracting feature quantity from the movement state; and means for comparing the feature quantity with a predetermined reference to retrieve a command corresponding to the extracted feature quantity so that when there is a relevant command, the command is received as an input to be notified to said virtual world expressing system.

4. A command input system according to claim 3, wherein said means for detecting the movement state of the specific pixel pattern further comprises means for determining whether the specific pixel pattern exists in the image formed by said imaging means or not and for detecting the movement state of the specific image when the specific image exists.

5. A method of displaying at least one object on a screen where a virtual world is expressed, said method comprising the steps of:

determining an action of an operator;
causing said object to perform a first behavior when the action of said operator is determined; and
causing said object to perform a second behavior when the action of said operator is not determined.

6. A method according to claim 5, wherein said determination of the action of the operator includes selecting one among a plurality of patterns of predetermined behaviors.

7. A method according to claim 5, wherein said virtual world includes an environment which is changeable depending on setting of a season and time and depending on lapse of time.

8. A method according to claim 5, wherein a plurality of objects are displayed, and the method further comprises the steps of determining a possibility of collision among each of said objects with others of said objects and determining a moving direction of each of said objects so as to avoid such collision.

9. A method according to claim 5, wherein said step of causing said object to perform a first behavior includes calculating a distance and an angle between said object and a target point, and, based on the calculated distance and angle, setting a moving speed of said object and determining whether or not said object has to turn.

10. A method according to claim 5, wherein said step of causing said object to perform a first behavior includes setting a number of rotations about an axis in a moving direction of said object and causing said object to move within the set number of rotations.

11. A method according to claim 5, wherein said step of causing said object to perform a first behavior includes determining whether or not a current position, a current moving speed and a current moving direction are appropriate for acceleration for jumping, and causing said object to perform a third behavior when determined appropriate and a fourth behavior when not determined appropriate.

12. A method according to claim 5, further comprising the step of causing said object to swim at a target speed, wherein a target strength and a period of time for kicking being determined for said target swimming speed.

13. A method according to claim 12, wherein an angle of change of a direction of said object and a time duration during which the change of the direction of said object is effected are set for the change of the direction of said object.

14. A method according to claim 13, wherein said change of said object is effected by changing a figure of said object.

* * * * *